United States Patent
Itoh

(10) Patent No.: US 7,957,881 B2
(45) Date of Patent: Jun. 7, 2011

(54) VEHICLE AND METHOD OF CONTROLLING DRIVING FORCE FOR THE VEHICLE BASED ON DETECTED SLIP OF THE DRIVE WHEEL

(75) Inventor: Takao Itoh, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 504 days.

(21) Appl. No.: 12/279,438

(22) PCT Filed: Oct. 4, 2006

(86) PCT No.: PCT/JP2007/068932
§ 371 (c)(1),
(2), (4) Date: Aug. 14, 2008

(87) PCT Pub. No.: WO2008/041624
PCT Pub. Date: Apr. 10, 2008

(65) Prior Publication Data
US 2009/0101428 A1    Apr. 23, 2009

(30) Foreign Application Priority Data

Oct. 4, 2006   (JP) .................................. 2006-273168
Jun. 27, 2007  (JP) .................................. 2007-169200

(51) Int. Cl.
*B60K 28/16* (2006.01)
*B60W 40/10* (2006.01)
*B60W 40/12* (2006.01)

(52) U.S. Cl. ............................ 701/90; 701/87; 180/197
(58) Field of Classification Search ............... 701/22, 701/74, 80–82, 84, 87, 89, 90; 180/197; 73/862.191, 862.192; 303/121, 139, 141–145, 303/153, 160, 163–165, 175, 177, 180, 183
See application file for complete search history.

(56) References Cited

U.S. PATENT DOCUMENTS

| | | | | |
|---|---|---|---|---|
| 3,764,817 A | * | 10/1973 | Nakamura et al. | 307/10.1 |
| 3,904,251 A | * | 9/1975 | Hikida et al. | 303/163 |
| 4,615,410 A | * | 10/1986 | Hosaka | 180/197 |
| 5,501,109 A | * | 3/1996 | Naito et al. | 73/862.191 |
| 5,563,793 A | * | 10/1996 | Nakaura | 701/93 |

(Continued)

FOREIGN PATENT DOCUMENTS

| | | |
|---|---|---|
| JP | 09-210159 A | 8/1997 |
| JP | 10-153611 A | 6/1998 |
| JP | 10-331676 A | 12/1998 |
| JP | 2000-221207 A | 8/2000 |
| JP | 2006-044496 A | 2/2006 |

(Continued)

*Primary Examiner* — Thomas G Black
*Assistant Examiner* — Lindsay M Browder
(74) *Attorney, Agent, or Firm* — Kenyon & Kenyon LLP

(57) ABSTRACT

The occurrence or non-occurrence of a certain slip of a drive wheel is detected based on only a motor torque used for driving a vehicle, a brake torque, and a rotation speed of a motor computed from an output of a rotational position detection sensor. In response to detection of the occurrence of the certain slip, drive restriction of the motor is activated for slip control. The slip control is attainable by a brake system and the drive restriction of the motor. Even in the event of any failure or abnormality arising in the brake system or in the event of prohibiting traction control of the brake system in response to the driver's operation of a TRC off switch, the drive restriction of the motor accomplishes the slip control. This arrangement desirably prevents slip-induced unstable driving of the vehicle and damages of devices involved in slip control for the vehicle.

22 Claims, 13 Drawing Sheets

U.S. PATENT DOCUMENTS

| | | | | |
|---|---|---|---|---|
| 6,015,192 A * | 1/2000 | Fukumura | | 303/140 |
| 6,199,650 B1 * | 3/2001 | Masberg et al. | | 180/197 |
| 6,615,126 B1 * | 9/2003 | Potter et al. | | 701/84 |
| 6,740,004 B2 * | 5/2004 | Mori | | 477/97 |
| 7,203,578 B2 * | 4/2007 | Kuang et al. | | 701/22 |
| 7,377,349 B2 * | 5/2008 | Hommi et al. | | 180/197 |
| 7,617,036 B2 * | 11/2009 | Tan et al. | | 701/70 |
| 2005/0246087 A1 * | 11/2005 | Hommi et al. | | 701/80 |

FOREIGN PATENT DOCUMENTS

| | | |
|---|---|---|
| JP | 2006-340012 A | 2/2006 |
| JP | 2006-136175 A | 5/2006 |
| JP | 2006-137285 A | 6/2006 |
| JP | 2006-246614 A | 9/2006 |
| JP | 2007-106338 A | 4/2007 |

* cited by examiner

US 7,957,881 B2

VEHICLE AND METHOD OF CONTROLLING DRIVING FORCE FOR THE VEHICLE BASED ON DETECTED SLIP OF THE DRIVE WHEEL

This is a 371 national phase application of PCT/JP2007/068932 filed 28 Sep. 2007, claiming priority to Japanese Patent Applications No. JP 2006-273168 filed 4 Oct. 2006, and No. JP 2007-169200 filed 27 Jun. 2007, the contents of which are incorporated herein by reference.

TECHNICAL FIELD

The present invention relates to a vehicle and a control method of the vehicle.

BACKGROUND ART

One proposed structure of a vehicle is equipped with at least one motor provided in a power source used to output driving power to drive wheels and with an integration controller configured to detect a slip of the drive wheels and perform torque reduction control of the motor (see, for example, Patent Document 1). In the vehicle of this prior art structure, the smaller between a slip amount-based torque limit value and an angular acceleration-based torque limit value to a motor torque limit value. The slip amount-based torque limit value is based on a slip amount computed from wheel speeds of respective wheels transmitted from wheel speed sensors to a brake controller. The angular acceleration-based torque limit value is based on an angular acceleration of the motor computed from a motor rotation speed transmitted from a motor rotation speed sensor to the integration controller. A motor torque command value is set according to the motor torque limit value and a time constant relative to a road surface µ. The motor is then controlled with the set motor torque command value to enable slip control of the drive wheels.

Patent Document 1: Japanese Patent Laid-Open No. 2006-136175

DISCLOSURE OF THE INVENTION

One known technique for slip control of the drive wheels adopts the wheel speed sensors and the motor rotation speed sensor for the slip control. The technique of the simpler configuration is, however, preferable for the reduced number of assembly steps and the easy maintenance. Another known technique for slip control of the drive wheels by a single mechanism requires some special measure, since there is a potential for some failure or abnormality arising in the single mechanism. In one proposed structure of the vehicle having a function of allowing the driver to inactivate a slip controller, for example, with the driver's preference to the acceleration performance, the occurrence of a large slip in the inactive condition of the slip controller may cause troubles, such as unstable driving of the vehicle and overheat or damage of devices involved in the slip control for the vehicle. Some special measure is also needed by taking into account this potential.

In the vehicle and the control method of the vehicle, there would thus be a demand for enabling effective slip control by a simple configuration. In the vehicle and the control method of the vehicle, there would also be a demand for attaining slip control by multiple different mechanisms. In the vehicle and the control method of the vehicle, there would further be a demand for preventing slip-induced unstable driving of the vehicle and damages of devices involved in slip control for the vehicle.

At least part of the above and the other related demands is attained by a hybrid vehicle and its control method having the configurations discussed below.

According to one aspect, the invention pertains to a vehicle including: a power source arranged to output driving power to a driveshaft linked with a drive wheel; a rotation speed detector structured to obtain a rotation speed of the driveshaft as a driveshaft rotation speed; an angular acceleration computation module configured to compute an angular acceleration of the drive wheel as a computed drive wheel angular acceleration from the obtained driveshaft rotation speed; a drive wheel rotation speed computation module configured to compute a rotation speed of the drive wheel as a computed drive wheel rotation speed from the obtained driveshaft rotation speed; an estimated vehicle body speed computation module configured to compute an estimated speed of a vehicle body as an estimated vehicle body speed by integration of an actual driving force actually used for driving the vehicle and the computed drive wheel angular acceleration; a slip detection module configured to detect occurrence or non-occurrence of a certain slip of the drive wheel, based on a rotation speed of the drive wheel expected from the estimated vehicle body speed and the computed drive wheel rotation speed; and a control module configured, in response to detection of non-occurrence of the certain slip by the slip detection module, to control the power source to output a driving force corresponding to a driving force demand required for driving and drive the vehicle with the output driving force, and in response to detection of the occurrence of the certain slip by the slip detection module, to control the power source to output a driving force corresponding to the driving force demand with drive restriction of the power source and drive the vehicle with the restricted output driving force.

The vehicle according to one aspect of the invention computes the estimated speed of the vehicle body as the estimated vehicle body speed by integration of the actual driving force actually used for driving the vehicle and the computed drive wheel angular acceleration computed from the driveshaft rotation speed as the rotation speed of the driveshaft. Occurrence or non-occurrence of the certain slip of the drive wheel is then detected, based on the rotation speed of the drive wheel expected from the estimated vehicle body speed and the computed drive wheel rotation speed computed from the driveshaft rotation speed. In response to detection of non-occurrence of the certain slip, the power source is controlled to output a driving force corresponding to a driving force demand required for driving and drive the vehicle with the output driving force. In response to detection of the occurrence of the certain slip, on the other hand, the power source is controlled to output a driving force corresponding to the driving force demand with drive restriction of the power source and drive the vehicle with the restricted output driving force. The vehicle of this aspect enables detection and control of the certain slip, based on only the actual driving force actually used for driving the vehicle and the driveshaft rotation speed. This arrangement enables effective slip control by the simple configuration. Here the actual driving force actually used for driving the vehicle and the driving force demand required for driving include both a driving force for acceleration and a braking force for deceleration.

In one preferable embodiment according to this aspect of the invention, the vehicle is further equipped with a slip controller configured to detect a slip or no slip of the drive wheel based on a rotation speed of the drive wheel as a drive wheel rotation speed and to apply a braking force to the drive wheel, in response to detection of the slip, in order to control the slip of the drive wheel. Here the certain slip represents a slip having a slip rate of not less than a preset threshold value that is greater than a minimum slip rate suggesting detection of a slip by the slip controller, where the slip rate is obtained by subtracting a calculated wheel speed of the drive wheel corresponding to a vehicle body speed from an actual wheel speed of the drive wheel with detection of the slip. The slip controller is activated to control a slip other than the certain slip, whereas the slip controller and the drive restriction of the power source cooperatively work to control the certain slip. Even in the event of some failure or abnormality arising in the slip controller, the drive restriction of the power source is activated to control the certain slip. This arrangement desirably prevents potential troubles induced by the occurrence of a slip, for example, slip-induced unstable driving of the vehicle and damages of devices involved in slip control for the vehicle. The vehicle of this embodiment may further be equipped with a slip controller off switch provided in a neighborhood of a driver's seat of the vehicle and configured to deactivate the slip controller. This arrangement ensures effective control of the certain slip by means of the drive restriction of the power source even in an off condition of the slip controller.

According to one preferable application of the vehicle in this aspect of the invention, the estimated vehicle body speed computation module computes the estimated vehicle body speed by time integration of a difference between the actual driving force actually used for driving the vehicle and a product of the computed drive wheel angular acceleration and a moment of inertia of the drive wheel. The estimated vehicle body speed computation module may reset an integrated value of the time integration to 0, when a calculated wheel speed of the drive wheel corresponding to a vehicle body speed is equal to 0. This application ensures adequate computation of the estimated vehicle body speed.

In another preferable embodiment according to the above aspect of the invention, the vehicle is further equipped with a braking force application structure configured to apply a braking force to the drive wheel. The estimated vehicle body speed computation module computes the estimated vehicle body speed based on the actual driving force actually used for driving the vehicle, which is equal to a sum of a driving force output from the power source and a braking force output from the braking force application structure. This arrangement ensures highly accurate computation of the estimated vehicle body speed. In one preferable application of the vehicle of this embodiment, the estimated vehicle body speed computation module corrects the braking force output from the braking force application structure according to the computed drive wheel rotation speed to set a braking force for computation of the estimated vehicle body speed and computes the estimated vehicle body speed based on a sum of the driving force output from the power source and the set braking force for computation of the estimated vehicle body speed. It is preferable that the estimated vehicle body speed computation module sets the braking force for computation of the estimated vehicle body speed with a change of a plus-minus sign relative to a change of a plus-minus sign of the computed drive wheel rotation speed. This arrangement ensures an effective response to a change of the plus-minus sign of the computed drive wheel rotation speed. It is also preferable that the estimated vehicle body speed computation module sets 0 to the braking force for computation of the estimated vehicle body speed when the computed drive wheel rotation speed is in a predetermined first range including a value of 0. This arrangement effectively prevents inclusion of an error in the estimated vehicle body speed caused by application of the braking force by the braking force application structure during a stop of the vehicle. In this application, the estimated vehicle body speed computation module may set the braking force for computation of the estimated vehicle body speed to have a stepwise change relative to a variation in computed drive wheel rotation speed, when the computed drive wheel rotation speed is in a predetermined second range including the predetermined first range. This arrangement desirably prevents a discrete change of the estimated vehicle body speed.

According to another preferable application of the vehicle in the above aspect of the invention, the slip detection module detects the occurrence or non-occurrence of the certain slip, based on the estimated vehicle body speed, a road surface slope, and the computed drive wheel rotation speed. This arrangement effectively prevents inclusion of an error in the estimated vehicle body speed caused by the road surface slope. In one preferable embodiment of the vehicle of this application, the slip detection module corrects the estimated vehicle body speed according to the road surface slope and detects the occurrence or non-occurrence of the certain slip based on the corrected estimated vehicle body speed and the computed drive wheel rotation speed. In one preferable example of the vehicle of this embodiment, the slip detection module corrects the estimated vehicle body speed to eliminate an error induced by the road surface slope and included in the estimated vehicle body speed. This arrangement more effectively prevents an error caused by the road surface slope from being included in the estimated vehicle body speed. In another preferable example of the vehicle of the above embodiment, upon detection of the occurrence of the certain slip of the drive wheel, the slip detection module does not perform the correction of the estimated vehicle body speed according to the road surface slope. This arrangement enables the correction of the estimated vehicle body speed according to the requirements.

According to still another preferable application of the vehicle in the above aspect of the invention, the slip detection module restricts a slip rate as a difference between the estimated vehicle body speed and the computed drive wheel rotation speed with an upper limit value and a lower limit value, which are set corresponding to a driver's selected gearshift position among multiple gearshift positions including a forward drivable gearshift position and a reverse drivable gearshift position, and detects the occurrence or non-occurrence of the certain slip of the drive wheel based on the restricted slip rate. This arrangement effectively prevents a generally unexpected value relative to the selected gearshift position from being set to the slip rate by inclusion of some error in the estimated vehicle body speed. In one preferable embodiment of the vehicle of this application, the slip detection module restricts the slip rate with the upper limit value and the lower limit value set equal to 0 at any gearshift position other than the forward drivable gearshift position and the reverse drivable gearshift position, restricts the slip rate with the upper limit value set equal to a preset first value and the lower limit value set equal to 0 or a negative value close to 0 at the forward drivable gearshift position, and restricts the slip rate with the upper limit value set equal to 0 or a positive value close to 0 and the lower limit value set equal to a preset second value at the reverse drivable gearshift position. In the vehicle of this embodiment, the slip detection module may perform a rating process to change the upper limit value and the lower limit value in a stepwise manner in response to a change of the gearshift position. This arrangement desirably prevents an abrupt change of the slip rate in response to a change of the gearshift position. In the vehicle of this embodiment, it is preferable that the slip detection module sets the upper limit value by increasing stepwise at a first rate to the preset first value in response to a change of the gearshift position to the forward drivable gearshift position, and sets the upper limit value by decreasing stepwise at a second rate, which is smaller than the first rate, from the preset first value in response to a change of the gearshift position from the forward drivable gearshift position to another gearshift position. In the vehicle of this embodiment, it is also preferable that the slip detection module sets the lower limit value by decreasing stepwise at a third rate to the preset second value in response to a change of the gearshift position to the reverse drivable gearshift position, and sets the lower limit value by increasing stepwise at a fourth rate, which is smaller than the third rate, from the preset second value in response to a change of the gearshift position from the reverse drivable gearshift position to another gearshift position.

According to another preferable application of the vehicle in the above aspect of the invention, the control module controls the power source with a greater drive restriction in response to a greater degree of a slip. This application enables the more powerful slip control in response to detection of a greater degree of slip of the drive wheel, thus effectively preventing the slip-induced unstable driving of the vehicle and the damages of devices involved in slip control for the vehicle.

In one preferable structure of the vehicle according to the above aspect of the invention, the power source includes a motor connected to the driveshaft, and the rotation speed detector detects a rotational position of a rotor in the motor and computes the driveshaft rotation speed from the detected rotational position. In the vehicle of this structure, a sensor used for drive control of the motor is adoptable for detection of the occurrence or non-occurrence of a slip of the drive wheel. This structure enables slip control by the simpler configuration.

Another aspect of the invention is directed to a control method of a vehicle equipped with a power source configured to output driving power to a driveshaft linked with a drive wheel. The control method computes an estimated speed of a vehicle body as an estimated vehicle body speed by integration of an actual driving force actually used for driving the vehicle and a computed drive wheel angular acceleration computed from a driveshaft rotation speed as a rotation speed of the driveshaft. Occurrence or non-occurrence of a certain slip of the drive wheel is then detected, based on a rotation speed of the drive wheel expected from the estimated vehicle body speed and a computed drive wheel rotation speed computed from the driveshaft rotation speed. In response to detection of non-occurrence of the certain slip, the control method controls the power source to output a driving force corresponding to a driving force demand required for driving and drive the vehicle with the output driving force. In response to detection of the occurrence of the certain slip, on the other hand, the control method controls the power source to output a driving force corresponding to the driving force demand with drive restriction of the power source and drive the vehicle with the restricted output driving force.

The control method of the vehicle according to another aspect of the invention computes the estimated speed of the vehicle body as the estimated vehicle body speed by integration of the actual driving force actually used for driving the vehicle and the computed drive wheel angular acceleration computed from the driveshaft rotation speed as the rotation speed of the driveshaft. Occurrence or non-occurrence of the certain slip of the drive wheel is then detected, based on the rotation speed of the drive wheel expected from the estimated vehicle body speed and the computed drive wheel rotation speed computed from the driveshaft rotation speed. In response to detection of non-occurrence of the certain slip, the power source is controlled to output a driving force corresponding to a driving force demand required for driving and drive the vehicle with the output driving force. In response to detection of the occurrence of the certain slip, on the other hand, the power source is controlled to output a driving force corresponding to the driving force demand with drive restriction of the power source and drive the vehicle with the restricted output driving force. The control method of the vehicle in this aspect enables detection and control of the certain slip, based on only the actual driving force actually used for driving the vehicle and the driveshaft rotation speed. This arrangement enables effective slip control by the simple configuration. Here the actual driving force actually used for driving the vehicle and the driving force demand required for driving include both a driving force for acceleration and a braking force for deceleration.

BEST MODES OF CARRYING OUT THE INVENTION

Figure 1:
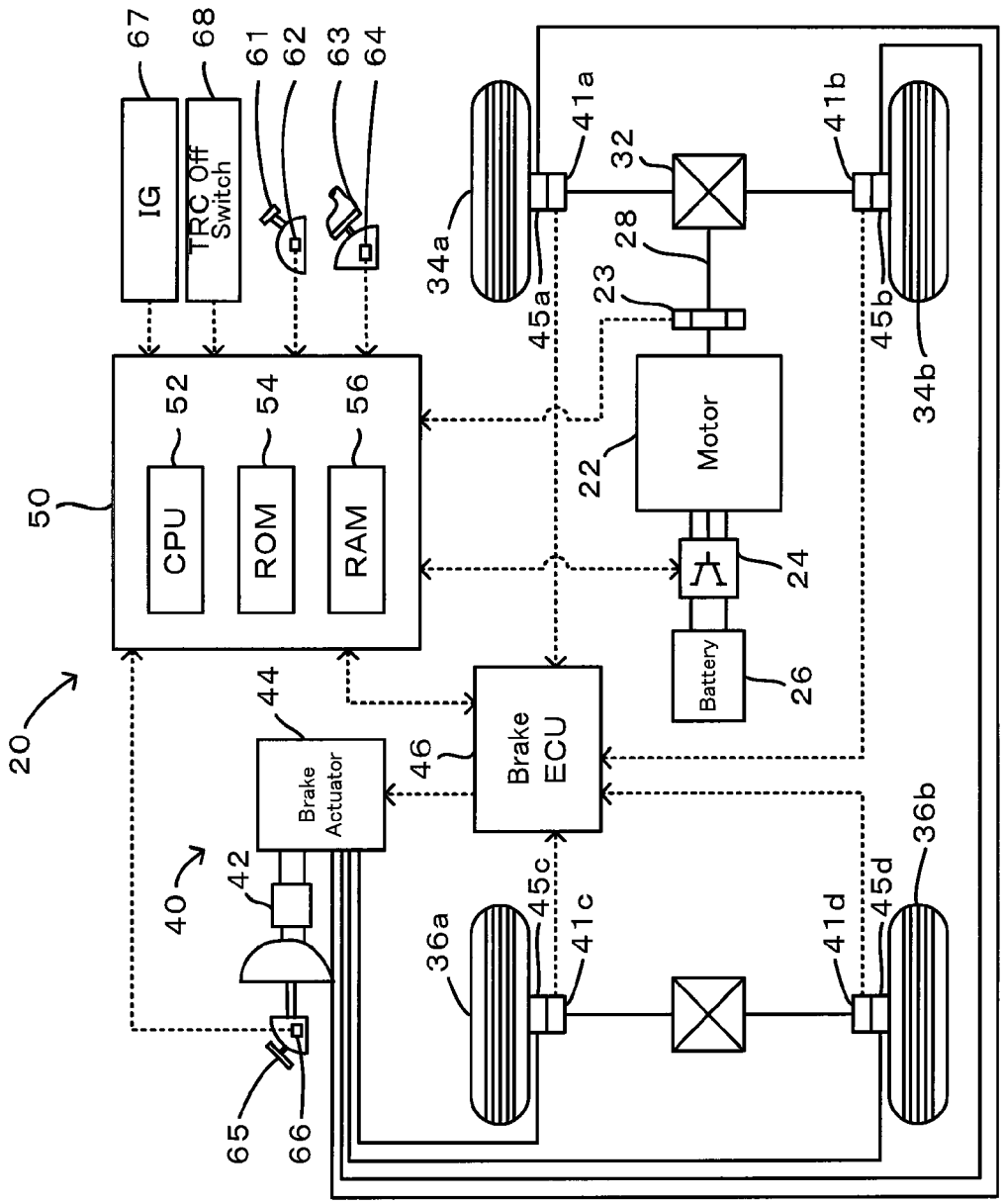
FIG. 1 schematically illustrates the configuration of an electric vehicle 20 in one embodiment according to the invention.

One mode of carrying out the invention is described below as a preferred embodiment with reference to the accompanied drawings. FIG. 1 schematically illustrates the configuration of an electric vehicle 20 in one embodiment according to the invention. As illustrated, the electric vehicle 20 of the embodiment has a motor 22 configured to input and output power from and to a driveshaft 28 linked with drive wheels 34a and 34b via a differential gear 32, a rotational position detection sensor 23 constructed to detect a rotational position of a rotor in the motor 22, a brake system 40 configured to apply a mechanical braking force onto the drive wheels 34a and 34b by a supply of hydraulic pressure from a brake actuator 44, and a main electronic control unit 50 configured to control the operations of the whole electric vehicle 20.

The motor 22 is constructed as a known synchronous motor generator to transmit electric power to and from a battery 26 via an inverter 24. The rotational position detection sensor 23 is, for example, a resolver provided on the driveshaft 28 linked with the rotor of the motor 22 and constructed to detect the positions of magnetic poles of permanent magnets.

The brake system 40 includes a brake master cylinder 42 structured to produce a hydraulic pressure (brake pressure) in response to the driver's depression of a brake pedal 65, a brake actuator 44 configured to supply regulated hydraulic pressures to brake wheel cylinders 45a and 45b of the drive wheels 34a and 34b and to brake wheel cylinders 45c and 45d of driven wheels 36a and 36b, wheel speed sensors 41a and 41b attached to the drive wheels 34a and 34b, wheel speed sensors 41c and 41d attached to the driven wheels 36a and 36b, and a brake electronic control unit (hereafter referred to as brake ECU) 46 configured to control the operations of the brake actuator 44. The brake actuator 44 regulates the supplies of the hydraulic pressures to the brake wheel cylinders 45a through 45d to enable application of brake torques to the respective wheels 34a, 34b, 36a, and 36b, which satisfy a brake share of a total required braking force for the electric vehicle 20 determined according to the brake pressure and a rotation speed Nm of the motor 22, while regulating the supplies of the hydraulic pressures to the brake wheel cylinders 45a through 45d to enable application of brake torques to the respective wheels 34a, 34b, 36a, and 36b, independently of the brake pressure. The brake ECU 46 inputs signals from various sensors, for example, drive wheel speeds Vfl and Vfr from the wheel speed sensors 41a and 41b, driven wheel speeds Vrl and Vrr from the wheel speed sensors 41c and 41d, and a steering angle from a steering angle sensor (not shown). The brake ECU 46 also outputs control signals to the brake actuator 44 to enable antilock braking system (ABS) control for preventing a lock of any of the drive wheels 34a and 34b and the driven wheels 36a and 36b from occurring in response to the driver's depression of the brake pedal 65, traction control (TRC) for preventing a slip of either of the drive wheels 34a and 34b from occurring in response to the driver's depression of an accelerator pedal 63, and vehicle stability control (VSC) for keeping the stability of the electric vehicle 20 in a turn. The brake system 40 accordingly functions as a slip controller to control a slip of the drive wheels 34a and 34b, while functioning as the conventional braking device to apply a braking force in response to the driver's depression of the brake pedal 65. The brake ECU 46 establishes communication with the main electronic control unit 50 to control the operations of the brake actuator 44 in response to control signals from the main electronic control unit 50 and to output data regarding the conditions of the brake actuator 44 and the received data to the main electronic control unit 50 according to the requirements. The traction control (TRC) performed by the brake ECU 46 detects a slip of a drive wheel when a slip rate representing a difference between the corresponding drive wheel speed Vfl or Vfr and a vehicle body speed Vr as an average of the driven wheel speeds Vrl and Vrr reaches or exceeds a preset relatively small threshold value Vs1 (for example, 5 km/hour). The traction control (TRC) then controls the brake actuator 44 to apply a greater brake torque to the slip-detected drive wheel against a higher slip rate.

The main electronic control unit 50 is constructed as a microprocessor including a CPU 52, a ROM 54 configured to store processing programs, a RAM 56 configured to temporarily store data, input and output ports (not shown), and a communication port (not shown). The main electronic control unit 50 receives, via its input port, a rotational position $\theta m$ of the rotor in the motor 22 from the rotational position detection sensor 23, phase currents from a current sensor (not shown) attached to a power line from the inverter 24 to the motor 22, a gearshift position SP or a current setting position of a gearshift lever 61 from a gearshift position sensor 62, an accelerator opening Acc or the driver's depression amount of the accelerator pedal 63 from an accelerator pedal position sensor 64, a brake pedal position BP or the driver's depression amount of the brake pedal 65 from a brake pedal position sensor 66, an ignition signal from an ignition switch 67, and an on-off signal from a TRC off switch 68 provided in front of the driver's seat and operated by the driver to prohibit the traction control (TRC) by the brake ECU 46. The main electronic control unit 50 outputs, via its output port, switching control signals to the inverter 24 to drive and control the motor 22. The main electronic control unit 50 makes communication with the brake ECU 46 via its communication port to transmit diversity of control signals and data to and from the brake ECU 46.

In the electric vehicle 20 of the embodiment, at least a parking position (P position) for parking, a neutral position (N position), a drive position (D position) for general forward driving, and reverse position (R position) for reverse driving are detectable as the gearshift position SP of the gearshift lever 81 by the gearshift position sensor 82.

Figure 2:
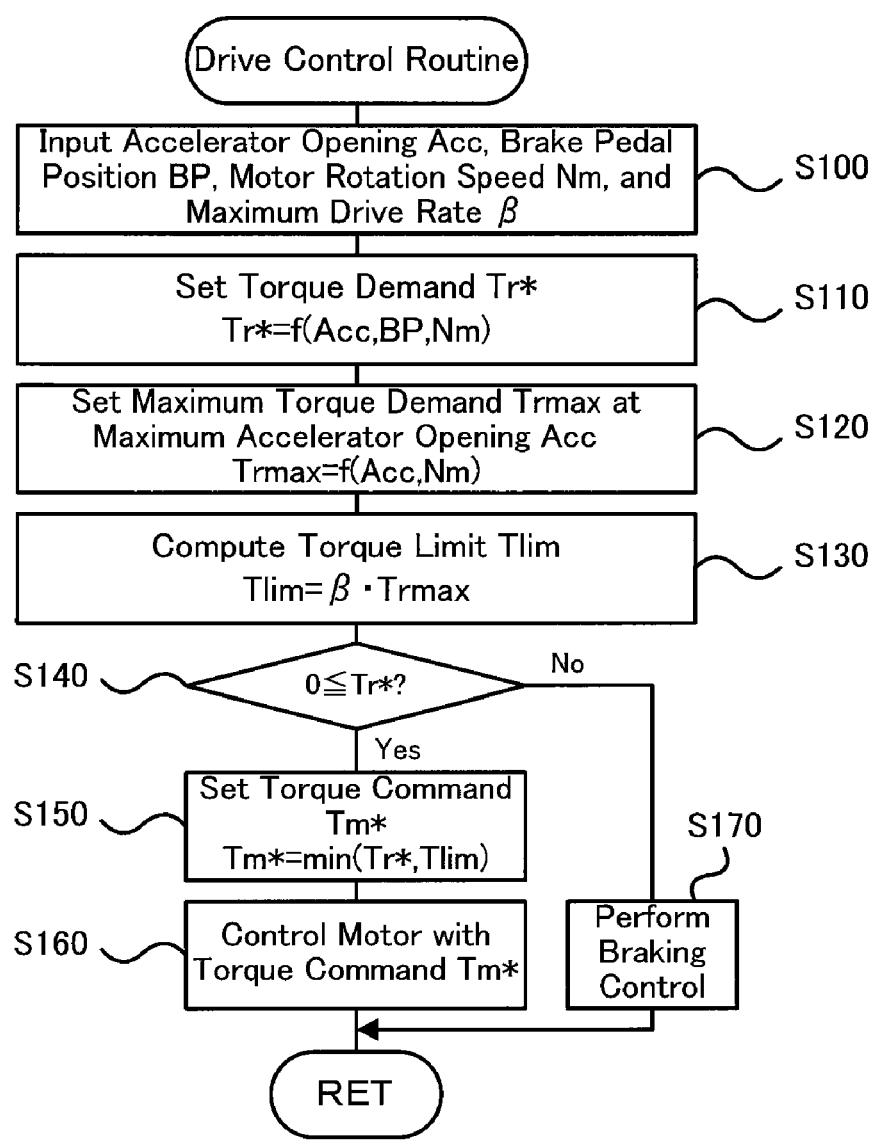
FIG. 2 is a flowchart showing a drive control routine executed by a main electronic control unit 50 in the embodiment.

The description regards the operations of the electric vehicle 20 having the configuration discussed above. FIG. 2 is a flowchart showing a drive control routine executed by the CPU 52 of the main electronic control unit 50. This drive control routine is performed repeatedly at preset time intervals, for example, at every several msec.

On the start of the drive control routine of FIG. 2, the CPU 52 of the main electronic control unit 50 first inputs various data required for control, for example, the accelerator opening Acc from the accelerator pedal position sensor 64, the brake pedal position BP from the brake pedal position sensor 66, a rotation speed Nm of the motor 22, and a maximum drive rate $\beta$ for restriction of torque output of the motor 22 (step S100). The input rotation speed Nm of the motor 22 has been computed from the rotational position $\theta m$ of the rotor in the motor 22 detected by the rotational position detection sensor 23. The input maximum drive rate $\beta$ has been set according to a maximum drive rate setting process described later.

Figure 3:
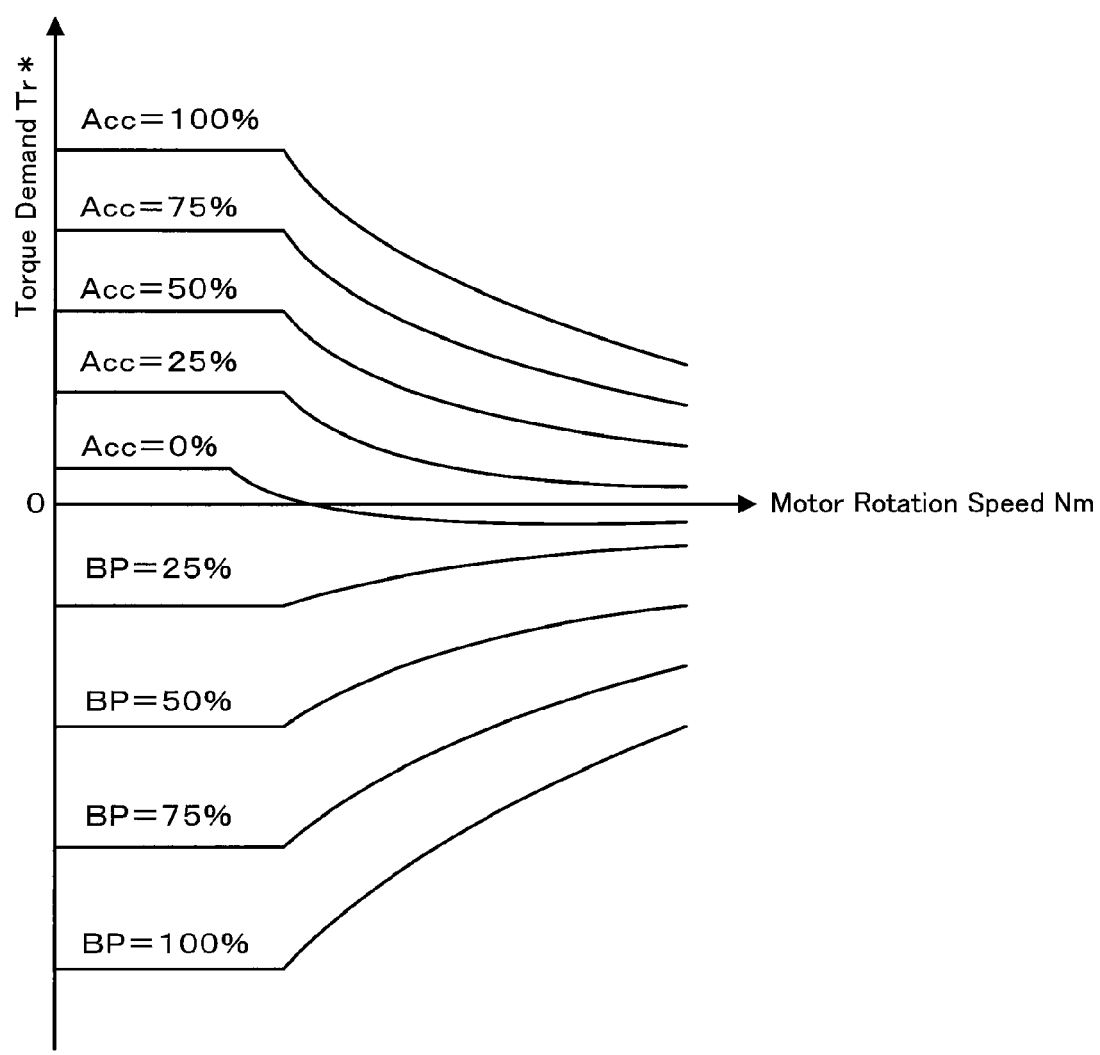
FIG. 3 shows one example of a torque demand setting map.

After the input of the required data, the CPU 52 sets a torque demand Tr* required for the driveshaft 28 according to the accelerator opening Acc or the brake pedal position BP and the rotation speed Nm of the motor 22 (step S110), and sets a maximum torque demand Trmax as a maximum possible torque required for the driveshaft 28 according to a maximum setting of the accelerator opening Acc and the rotation speed Nm of the motor 22 (step S120). A torque limit Tlim of the motor 22 is computed by multiplying the input maximum drive rate β by the set maximum torque demand Trmax (step S130). A concrete procedure of setting the torque demand Tr* in this embodiment provides and stores in advance variations in torque demand Tr* against the rotation speed Nm of the motor 22 with regard to various settings of the accelerator opening Acc or the brake pedal position BP as a torque demand setting map in the ROM 54 and reads the torque demand Tr* corresponding to the given rotation speed Nm and the given accelerator opening Acc or the brake pedal position BP from this torque demand setting map. One example of the torque demand setting map is shown in FIG. 3. The torque demand setting map of FIG. 3 is designed as a forward drive map adopted for the gearshift position SP set to the D position. This torque demand setting map is applicable as a reverse drive map for the gearshift position SP set to the R position with inversion of the signs of both the rotation speed Nm and the torque demand Tr*. In one modification, the variations in torque demand Tr* with regard to the various settings of the accelerator opening Acc or the brake pedal position BP in the reverse drive map may be set differently from those in the forward drive map. A concrete procedure of setting the maximum torque demand Trmax in this embodiment refers to this torque demand setting map and reads the torque demand Tr* corresponding to the given rotation speed Nm of the motor 22 and the maximum setting 100% of the accelerator opening Acc as the maximum torque demand Trmax from the torque demand setting map.

It is then determined whether the set torque demand Tr* is equal to or greater than 0 (step S140). When the torque demand Tr* is not less than 0, the CPU 52 restricts the torque demand Tr* to the torque limit Tlim and sets the smaller between the torque demand Tr* and the torque limit Tlim to a torque command Tm* of the motor 22 (step S150). After controlling the motor 22 with the set torque command Tm* (step S160), the CPU 52 exits from this drive control routine. The control operation of the motor 22 performs switching control of switching elements included in the inverter 24 to ensure output of a torque equivalent to the torque command Tm* from the motor 22.

When the torque demand Tr* is less than 0, on the other hand, the CPU 52 performs braking control by the cooperation of the motor 22 with the brake actuator 44 (step S170) and exits from this drive control routine. The braking control adequately divides and divisionally applies a total brake torque equivalent to the torque demand Tr* to the drive wheels 34a and 34b and to the driven wheels 36a and 36b, while maximizing a regenerative braking force of the motor 22. In an insufficient charge level of the battery 26, the braking control controls the motor 22 with the torque command Tm* of the motor 22 set to 0, while sending a brake torque command Tb* set corresponding to the torque demand Tr* to the brake ECU 46, in order to make the total brake torque equivalent to the torque demand Tr* fully satisfied by the brake torque of the brake actuator 44 (hydraulic brake torque). In a sufficient charge level of the battery 26, on the other hand, the braking control adequately determines share rates of the regenerative brake torque of the motor 22 and of the hydraulic brake torque of the brake actuator 44 to the total brake torque equivalent to the torque demand Tr*, with reference to a map representing a variation in share rates against the rotation speed Nm of the motor 22. The braking control then controls the motor 22 with the torque command Tm* set corresponding to the share rate of the regenerative brake torque, while sending the brake torque command Tb* set corresponding to the share rate of the hydraulic brake torque to the brake ECU 46. The brake ECU 46 receives the set brake torque command Tb* and controls the brake actuator 44 to apply a brake torque equivalent to a drive wheel brake torque command Tbf* as a portion of the brake torque command Tb* to the drive wheels 34a and 34b and to apply a brake torque equivalent to a driven wheel brake torque command Tbr* as a residual portion of the brake torque command Tb* to the driven wheels 36a and 36b.

Figure 4:
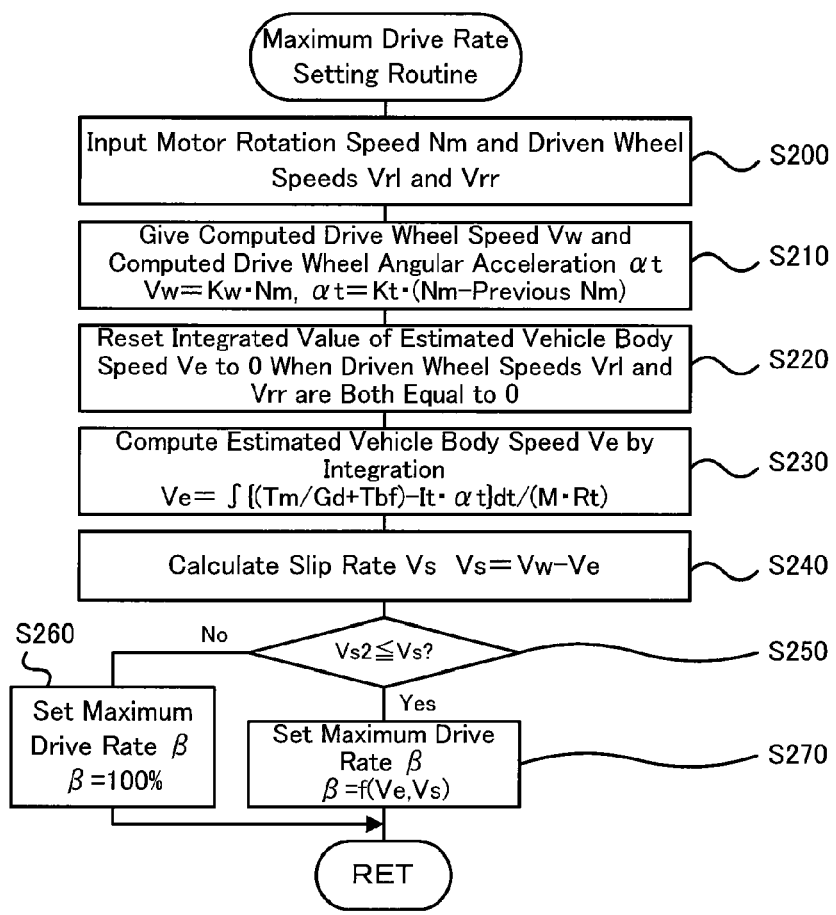
FIG. 4 is a flowchart showing a maximum drive rate setting routine executed by the main electronic control unit 50 in the embodiment.

The maximum drive rate setting process is described below in detail. FIG. 4 is a flowchart showing a maximum drive rate setting routine executed by the CPU 52 of the main electronic control unit 50. This maximum drive rate setting routine is also performed repeatedly at preset time intervals, for example, at every several msec.

On the start of the maximum drive rate setting routine of FIG. 4, the CPU 52 of the main electronic control unit 50 first inputs various data required for control, for example, the rotation speed Nm of the motor 22 and the driven wheel speeds Vrl and Vrr (step S200). The CPU 52 subsequently gives a computed drive wheel speed Vw and a computed drive wheel angular acceleration αt (step S210). The computed drive wheel speed Vw is obtained as the product of the input rotation speed Nm of the motor 22 and a conversion factor Kw for converting the motor rotation speed into the rotation speed of the drive wheel 34a and 34b. The computed drive wheel angular acceleration αt is obtained by subtracting a previous setting of the rotation speed Nm of the motor 22 input in a previous cycle of this routine from a current setting of the rotation speed Nm of the motor 22 input in a current cycle of this routine and multiplying the result of the subtraction by a conversion factor Kt for converting the motor rotation speed into the angular acceleration of the drive wheels 34a and 34b. The input rotation speed Nm of the motor 22 has been computed from the rotational position θm of the rotor in the motor 22 detected by the rotational position detection sensor 23. The driven wheel speeds Vrl and Vrr are received from the brake ECU 46 by communication.

When the input driven wheel speeds Vrl and Vrr are both equal to 0, the CPU 52 assumes a stop of the electric vehicle 20 and resets an integrated value of an estimated vehicle body speed Ve to 0 (step S220). The estimated vehicle body speed Ve is computed by integration operation over a time period from a start of the electric vehicle 20 to the current moment according to Equation (1) given later (step S230) where Tm denotes a motor torque by the motor 22, Tbf denotes a brake torque of the drive wheels 34a and 34b by the brake actuator 44, Gd denotes a gear ratio of the differential gear 32, It represents a moment of inertia of the drive wheels 34a and 34b, αt represents the computed drive wheel angular acceleration, M denotes a mass of the electric vehicle 20, and Rt denotes a radius of the drive wheels 34a and 34b. The motor torque Tm and the brake torque Tbf may be equal to the torque command Tm* used for controlling the motor 22 and the drive wheel brake torque command Tbf* used for controlling the brake actuator 44 in the drive control discussed previously. The brake torque Tbf may alternatively be equal to an observed brake torque actually adopted in the control by the brake ECU 46 and received from the brake ECU 46. The gear ratio Gd, the moment of inertia It, the mass M, and the radius Rt may be stored in advance in the ROM 54. In this embodiment, the estimated vehicle body speed Ve by integration operation according to Equation (1) is computable by adding and subtracting the calculated values of the motor torque Tm, the brake torque Tbf, and the computed drive wheel angular acceleration αt to and from the integrated value of the estimated vehicle body speed Ve to a previous cycle of this routine. Equation (1) is obtainable according to an equation of motion of the whole electric vehicle 20 and an equation of motion of the drive wheels 34a and 34b.

$$Ve=\int[(Tm/Gd+Tbf)-It\cdot\alpha t]\cdot dt/(M\cdot Rt) \quad (1)$$

A slip rate Vs of the drive wheels 34a and 34b is calculated by subtracting the computed drive wheel speed Vw from the estimated vehicle body speed Ve (step S240). It is then determined whether the calculated slip rate Vs is not less than a preset threshold value Vs2 (step S250). When the calculated slip rate Vs is less than the preset threshold value Vs2, the CPU 52 sets the maximum drive rate β to 100% to impose no restrictions on the torque output from the motor 22 (step S270) and exits from this maximum drive rate setting routine. The threshold value Vs2 is used as a criterion for detecting the occurrence of a significantly large slip of the drive wheels 34a and 34b and the requirement for slip control. In this embodiment, the threshold value Vs2 is set to be sufficiently greater (for example, 15 km/hour) than the relatively small threshold value Vs1 used in the traction control (TRC) by the brake ECU 46.

Figure 5:
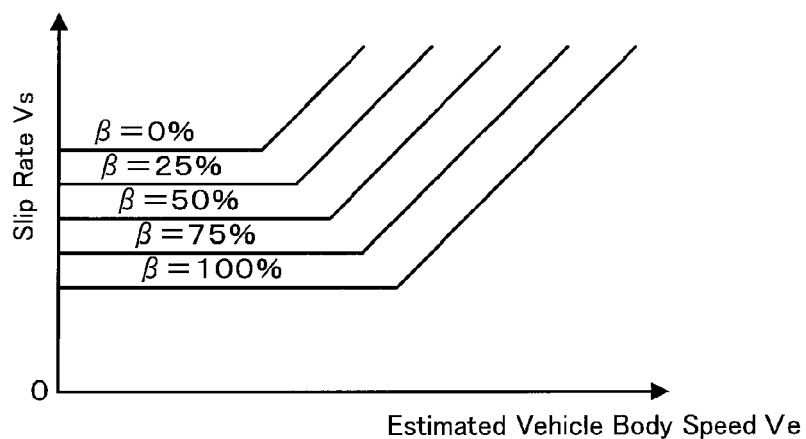
FIG. 5 shows one example of a maximum drive rate setting map.

The calculated slip rate Vs of not less than the preset threshold value Vs2 suggests the occurrence of a significantly large slip of the drive wheels 34a and 34b and the requirement for slip control. The CPU 52 then sets the maximum drive rate β according to the estimated vehicle body speed Ve and the slip rate Vs (step S270) and exits from this maximum drive rate setting routine. A concrete procedure of setting the maximum drive rate β in this embodiment provides and stores in advance a variation in maximum drive rate β relative to the estimated vehicle body speed Ve and the slip rate Vs as a maximum drive rate setting map in the ROM 54 and reads the maximum drive rate β corresponding to the given estimated vehicle body speed Ve and the given slip rate Vs from the maximum drive rate setting map. FIG. 5 shows one example of the maximum drive rate setting map. The maximum drive rate setting map of FIG. 5 is deigned to decrease the maximum drive rate β with an increase in slip rate Vs. This relation aims to set the smaller torque limit Tlim of the motor 22 against the greater degree of the slip. The subsequent drive control imposes the drive restriction of the motor 22 with the torque limit Tlim of the motor 22 set based on the maximum drive rate β, so as to attain the slip control.

Figure 6:
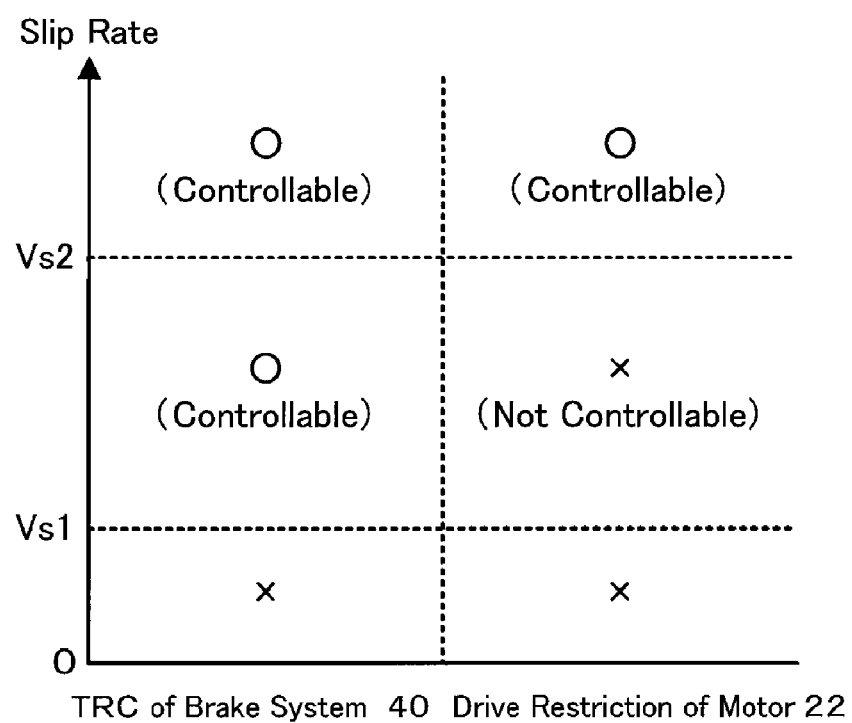
FIG. 6 conceptually shows the ranges of slips controllable by traction control (TRC) of a brake system 40 and drive restriction of a motor 22.

FIG. 6 conceptually shows the ranges of slips controllable by the traction control (TRC) of the brake system 40 and the drive restriction of the motor 22. As shown in FIG. 6, slips having the slip rate Vs of less than the threshold value Vs2 are controllable by only the brake system 40, while slips having the slip rate Vs of not less than the threshold value Vs2 are controllable by both the brake system 40 and the drive restriction of the motor 22. The slip rate Vs of less than the threshold value Vs1 is an allowable range for acceleration of the electric vehicle 20 and is thus not detected as a slip. Even in the event of disabling the traction control (TRC) by the occurrence of a failure in any of the wheel speed sensors 41a through 41d provided in the brake system 40 or any abnormality of the brake ECU 46, the drive restriction of the motor 22 accomplishes the slip control. This arrangement desirably prevents wheel slip-induced unstable driving of the electric vehicle 20 and protects the motor 22 from being damaged by over rotation. In the state of prohibiting the traction control (TRC) of the brake system 40 in response to the driver's operation of the TRC off switch 68, the drive restriction of the motor 22 accomplishes the slip control. The drive restriction of the motor 22 for the slip control is performed in response to detection of a slip, which is based on only the motor torque Tm used for driving, the brake torque Tbf, and the rotation speed Nm of the motor 22. Namely the slip control is attainable by the simple configuration.

As described above, the electric vehicle 20 of the embodiment detects the occurrence of a slip based on only the torque used for driving and the rotation speed of the motor 22 and performs the drive restriction of the motor 22 for slip control. This simple arrangement effectively accomplishes the slip control. Multiple different techniques, the traction control (TRC) of the brake system 40 and the drive restriction of the motor 22, are involved in the slip control. Even in the state of prohibiting or disabling the traction control (TRC) of the brake system 40, the drive restriction of the motor 22 effectively accomplishes the slip control, thus preventing the unstable driving of the electric vehicle 20 and unexpected damage of the motor 22.

Figure 7:
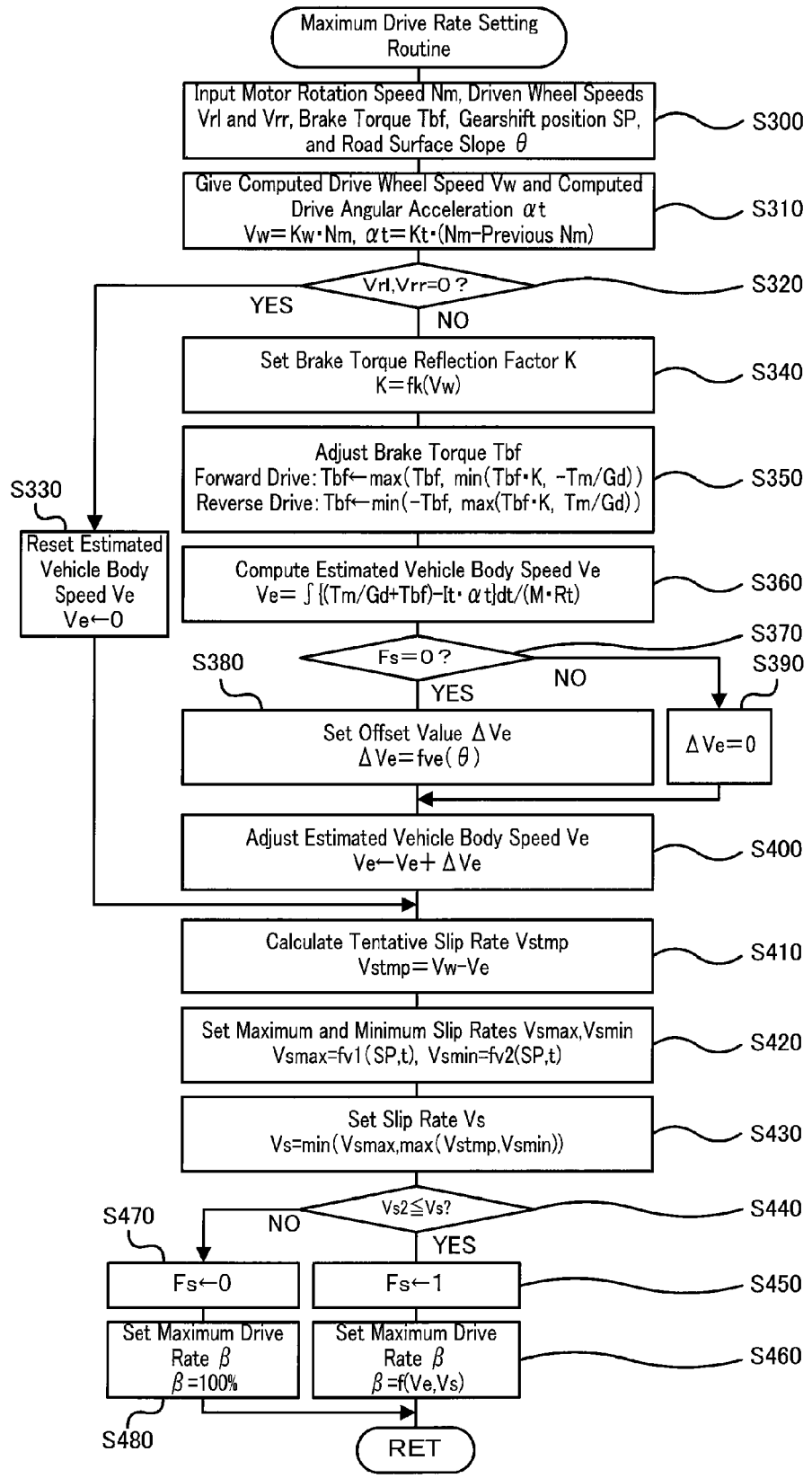
FIG. 7 is a flowchart showing a modified flow of the maximum drive rate setting routine in one modified example.

The electric vehicle 20 of the embodiment executes the maximum drive rate setting routine of FIG. 4 to compute the estimated vehicle body speed Ve and the slip rate Vs for slip control. The estimated vehicle body speed Ve and the slip rate Vs may be adjusted according to the requirements. FIG. 7 is a flowchart showing a modified flow of the maximum drive rate setting routine. The modified flow of the maximum drive rate setting routine of FIG. 7 inputs various data required for control, for example, the rotation speed Nm of the motor 22, the driven wheel speeds Vrl and Vrr, the brake torque Tbf, the gearshift position SP from the gearshift position sensor 62, and a road surface slope θ from a slope sensor (not shown) (step S300), and gives the computed drive wheel speed Vw and the computed drive wheel angular acceleration αt based on the input rotation speed Nm of the motor 22 (step S310). The brake torque Tbf is output to the drive wheels 34a and 34b according to the brake torque command Tb* by the brake ECU 46 and is received from the brake ECU 46 by communication. The input of the rotation speed Nm of the motor 22 and the driven wheel speeds Vrl and Vrr and the computation of the computed drive wheel speed Vw and the computed drive wheel angular acceleration αt have been described previously in the embodiment.

It is then determined whether the input driven wheel speeds Vrl and Vrr are equal to 0 (step S320). When the driven wheel speeds Vrl and Vrr are both equal to 0, the estimated vehicle body speed Ve is reset to 0 (step S330).

Figure 8:
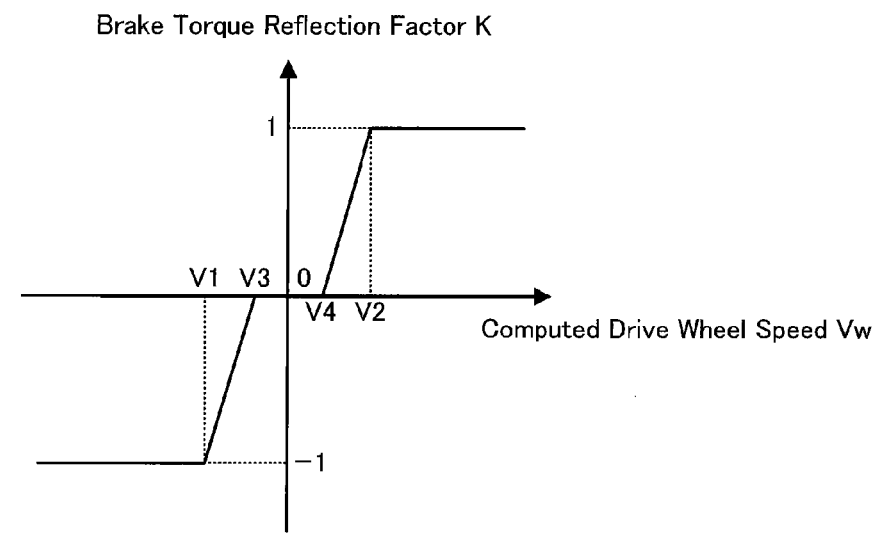
FIG. 8 shows one example of a brake torque reflection factor setting map.

When at least one of the driven wheel speeds Vrl and Vrr is not equal to 0, on the other hand, the CPU 52 sets a brake torque reflection factor K according to the computed drive wheel speed Vw (step S340). At the gearshift position SP set to the forward drivable position (D position), the brake torque Tbf is adjusted according to Equation (2) given later with the set brake torque reflection factor K, the brake torque Tbf, and the torque demand Tr* (step S350). At the gearshift position SP set to the reverse drivable position (R position), on the other hand, the brake torque Tbf is adjusted according to Equation (3) given later with the set brake torque reflection factor K, the brake torque Tbf, and the torque demand Tr* (step S350). The estimated vehicle body speed Ve is then computed from the adjusted brake torque Tbf, the input motor torque Tm, and the computed drive wheel angular acceleration αt according to Equation (1) given previously (step S360). A concrete procedure of setting the brake torque reflection factor K in this embodiment provides and stores in advance a variation in brake torque reflection factor K against the computed drive wheel speed Vw as a brake torque reflection factor setting map in the ROM 54 and reads the brake torque reflection factor K corresponding to the given computed drive wheel speed Vw from the brake torque reflection factor setting map. One example of the brake torque reflection factor setting map is shown in FIG. 8. According to the brake torque reflection factor setting map of FIG. 8, the brake torque reflection factor K is set equal to −1 at the computed drive wheel speed Vw of not higher than a negative value V1 (for example, −5 km/hour), and is set equal to 1 at the computed drive wheel speed Vw of not lower than a positive value V2 (for example, 5 km/hour). At the computed drive wheel speed Vw in the range of the negative value V1 to the positive value V2, the brake torque reflection factor K is sequentially increased or decreased toward 0. At the computed drive wheel speed Vw in the range of a relatively small negative value V3 (for example, −1 km/hour) higher than the negative value V1 to a relatively small positive value V4 (for example, 1 km/hour) lower than the positive value V2, the brake torque reflection factor K is set equal to 0. Setting the negative value to the brake torque reflection factor K at the negative computed drive wheel speed Vw aims to invert the sign in the state of reverse drive of the electric vehicle 20, since the brake torque Tbf takes a negative value irrespective of the forward or reverse drive of the electric vehicle 20. The brake torque reflection factor K is set to 0 at the computed drive wheel speed Vw in the range of the negative value V3 to the positive value V4, since the brake torque Tbf is not equal to 0 even at the stop of the electric vehicle 20 during the driver's depression of the brake pedal 65. The computation according to Equation (1) with the brake torque Tbf not equal to 0 accordingly gives the estimated vehicle body speed Ve not equal to 0, regardless of the stop of the electric vehicle 20. The sequential increase or the sequential decrease of the brake torque reflection factor K toward 0 at the computed drive wheel speed Vw in the range of the negative value V1 to the positive value V2 aims to prevent a discontinuous change of the brake torque Tbf with a variation in computed drive wheel speed Vw around 0. Equation (2) for the forward drive and Equation (3) for the reverse drive impose restrictions on the adjustment of the brake torque Tbf with the brake torque reflection factor K. This prevents inversion of the sign of the total torque (torque applied to the whole electric vehicle 20) of the adjusted brake torque Tbf and the motor torque Tm/Gd from the sign of the total torque of the original brake torque Tbf before adjustment and the motor torque Tm/Gd.

$$Tbf = \max(Tbf, \min(Tbf \cdot K, -Tm/Gd)) \quad (2)$$

$$Tbf = \max(-Tbf, \min(Tbf \cdot K, Tm/Gd)) \quad (3)$$

Figure 9:
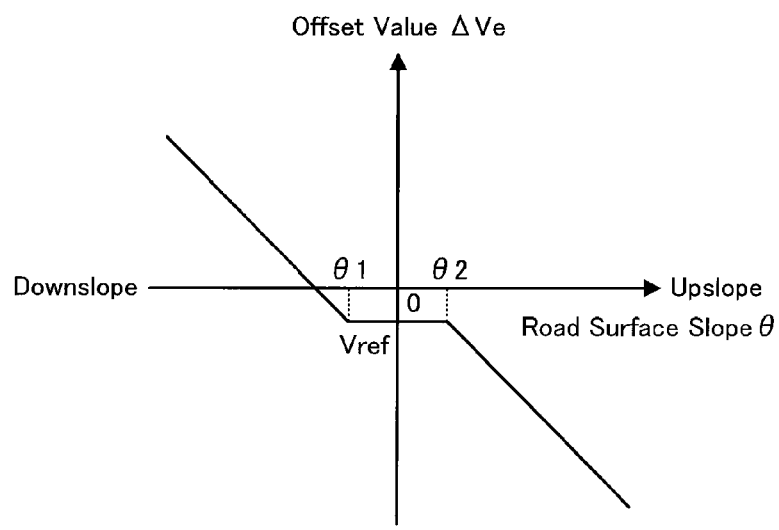
FIG. 9 shows one example of an offset value setting map.
Figure 10:
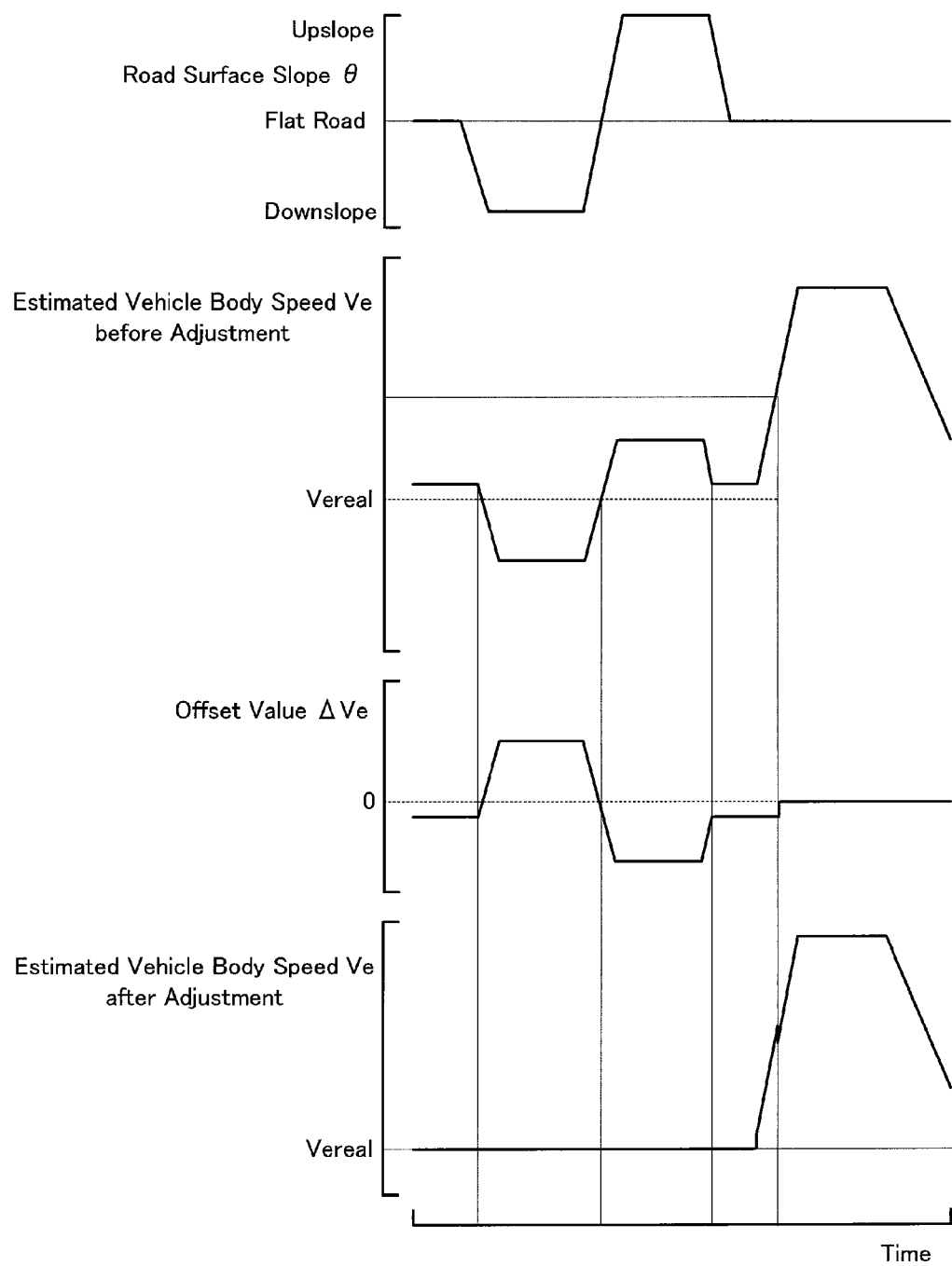
FIG. 10 shows time changes of a road surface slope θ, an estimated vehicle body speed Ve before adjustment, an offset value ΔVe, and the estimated vehicle body speed Ve after adjustment.

After the computation of the estimated vehicle body speed Ve, the CPU 52 identifies the value of a slip detection flag Fs (step S370). The slip detection flag Fs is set to 1 in response to detection of a slip at step S440 as explained later and is reset to 0 in response to detection of no slip or convergence of a slip at step S440. When the slip detection flag Fs is equal to 1, an offset value ΔVe is set according to the input road surface slope θ (step S380). When the slip detection flag Fs is equal to 0, on the other hand, the offset value Δve is set to 0 (step S390). The set offset value Δve is added to the estimated vehicle body speed Ve to offset and adjust the estimated vehicle body speed Ve (step S400). A concrete procedure of setting the offset value Δve experimentally or otherwise specifies and stores a variation in offset value Δve against the road surface slope θ as an offset value setting map in the ROM 54 and reads the offset value Δve corresponding to the given road surface slope θ from the offset value setting map. One example of the offset value setting map is shown in FIG. 9. According to the offset value setting map of FIG. 9, a negative value Vref is set to the offset value Δve at the road surface slope θ in the range of a slope θ1 to a slope θ2 suggesting a flat road. At the road surface slope θ of less than the slope θ1 suggesting a downslope road, the offset value Δve increases with an increase in steepness of the downslope. At the road surface slope θ of greater than the slope θ2 suggesting an upslope road, the offset value Δve decreases with an increase in steepness of the upslope. Equation (1) used for the computation of the estimated vehicle body speed Ve does not have a term of the road surface slope θ, so that the estimated vehicle body speed Ve includes a road surface slope θ-induced error. Setting the offset value Δve corresponding to the road surface slope θ and adjusting the estimated vehicle body speed Ve with the offset value Δve effectively eliminates the road surface slope θ-induced error included in the estimated vehicle body speed Ve. The negative value Vref is set to cancel out a potential loss of the drive system of the vehicle running on the flat road as well as a driving resistance-induced error included in the estimated vehicle body speed Ve. FIG. 10 shows time changes of the road surface slope θ, the estimated vehicle body speed Ve before adjustment, the offset value ΔVe, and the estimated vehicle body speed Ve after adjustment. As illustrated in this time chart, the estimated vehicle body speed Ve before adjustment varies with a variation in road surface slope θ. The offset value ΔVe is set to cancel out this variation of the estimated vehicle body speed Ve and accordingly offset the estimated vehicle body speed Ve. This eliminates the road surface slope θ-induced error included in the estimated vehicle body speed Ve (that is, a difference from a real vehicle speed Vereal in FIG. 10).

Figure 11:
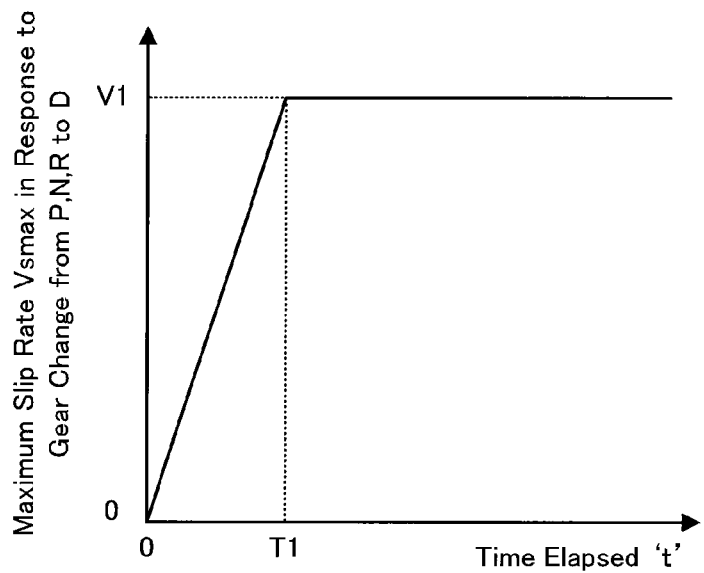
FIG. 11 shows a variation of a maximum slip rate Vsmax against time elapsed 't' since a change of the gearshift position SP from any of a P position, an N position, and an R position to a D position.
Figure 12:
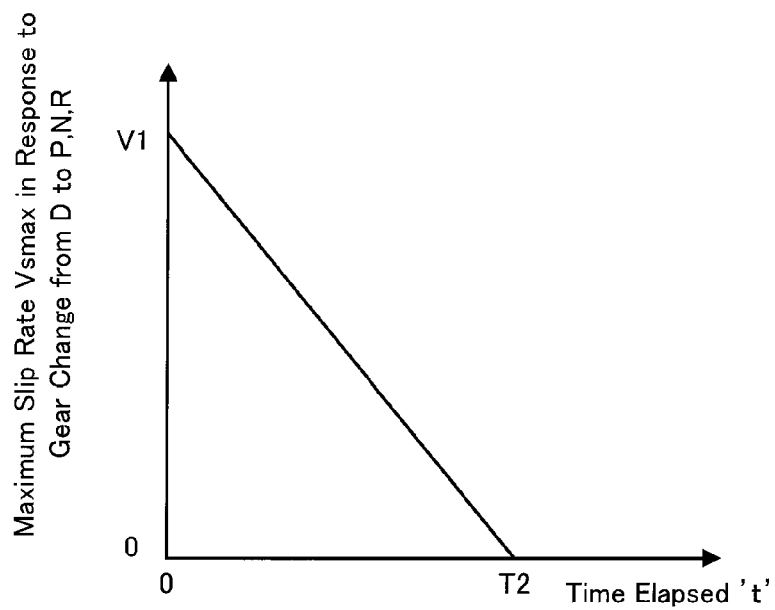
FIG. 12 shows a variation of the maximum slip rate Vsmax against the time elapsed 't' since a change of the gearshift position SP from the D position to any of the P position, the N position, and the R position.
Figure 13:
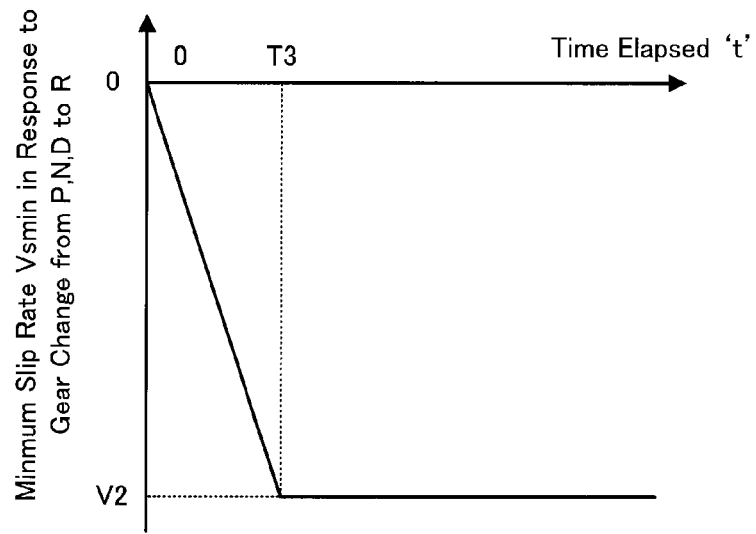
FIG. 13 shows a variation of a minimum slip rate Vsmin against the time elapsed 't' since a change of the gearshift position SP from any of the P position, the N position, and the D position to the R position.
Figure 14:
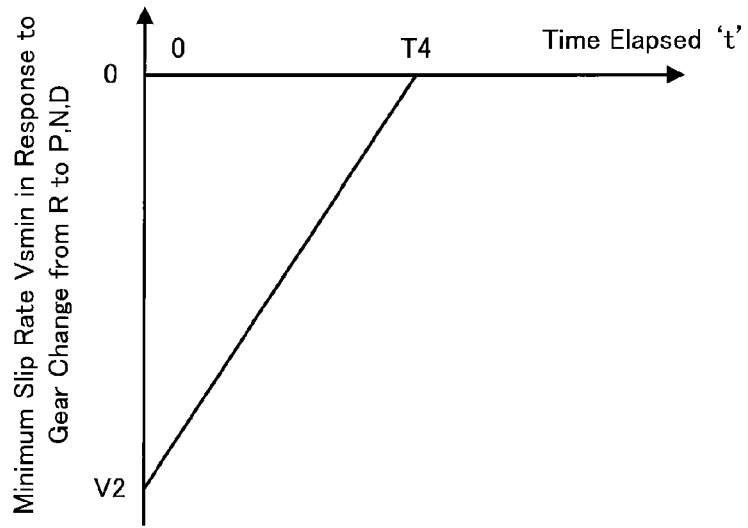
FIG. 14 shows a variation of the minimum slip rate Vsmin against the time elapsed 't' since a change of the gearshift position SP from the R position to any of the P position, the N position, and the D position.

After adjustment of the estimated vehicle body speed Ve, the result of subtraction of the estimated vehicle body speed Ve after adjustment from the computed drive wheel speed Vw is given as a tentative slip rate Vstmp (step S410). Maximum and minimum slip rates Vsmax and Vsmin are set as upper and lower guard values according to the current gearshift position SP and a time elapsed 't' since a gear change to the current gearshift position SP (step S420). The slip rate Vs is set by restricting the calculated tentative slip rate Vstmp with the maximum and minimum slip rates Vsmax and Vsmin (step S430). A concrete procedure of setting the maximum and minimum slip rates Vsmax and Vsmin in this embodiment provides and stores in advance variations of the maximum slip rate Vsmax and the minimum slip rate Vsmin against the time elapsed 't' since a gear change to the current gearshift position SP with regard to the current settings of the gearshift position SP as slip rate limitation setting maps in the ROM 54 and reads the maximum slip rate Vsmax and the minimum slip rate Vsmin corresponding to the given gearshift position SP and the given time elapsed 't' from the slip rate limitation setting maps. Examples of the slip rate limitation setting maps are shown in FIGS. 11 through 14. FIG. 11 shows a variation of the maximum slip rate Vsmax against the time elapsed 't' since a change of the gear shift position SP from any of the P position, the N position, and the R position to the D position. FIG. 12 shows a variation of the maximum slip rate Vsmax against the time elapsed 't' since a change of the gearshift position SP from the D position to any of the P position, the N position, and the R position. FIG. 13 shows a variation of the minimum slip rate Vsmin against the time elapsed 't' since a change of the gearshift position SP from any of the P position, the N position, and the D position to the R position. FIG. 14 shows a variation of the minimum slip rate Vsmin against the time elapsed 't' since a change of the gearshift position SP from the R position to any of the P position, the N position, and the D position. The maximum slip rate Vsmax and the minimum slip rate Vsmin are set equal to or close to 0 irrespective of the time elapsed 't' with regard to any patterns of the gearshift position SP other than the gear change patterns shown in FIGS. 11 through 14, although not being specifically illustrated. In this embodiment, the maximum and the minimum slip rates Vsmax and Vsmin are set to 0 at the setting of the gearshift position SP to the P position or the N position. At the setting of the gearshift position SP to the D position, the minimum slip rate Vsmin is set to a negative value close to 0, for example, −2 km/hour, −3 km/hour, or −5 km/hour. At the Setting of the gearshift position SP to the R position, the maximum slip rate Vsmax is set to a positive value close to 0, for example, 2 km/hour, 3 km/hour, or 5 km/hour. A value 'V1' in the maps of FIGS. 11 and 12 are set to a sufficiently large positive value, for example, 100 km/hour or 120 km/hour, in order to prevent the slip rate Vs from exceeding this value 'V1' even in the event of a slip of the drive wheels 34a and 34b during the forward drive of the vehicle. A value 'V2' in the maps of FIGS. 13 and 14 are set to a sufficiently small negative value, for example, −100 km/hour or −120 km/hour, in order to prevent the slip rate Vs from becoming below this value 'V2' even in the event of a slip of the drive wheels 34a and 34b during the reverse drive of the vehicle. A value 'T1' in the map of FIG. 11 represents a time required for the rating process of increasing stepwise the maximum slip rate Vsmax to the value V1. A value 'T2' in the map of FIG. 12 represents a time required for the rating process of decreasing stepwise the maximum slip rate Vsmax from the value V1 and is longer than the time T1 to ensure a gentler stepwise change of the maximum slip rate Vsmax. A value 'T3' in the map of FIG. 13 represents a time required for the rating process of decreasing stepwise the minimum slip rate Vsmin to the value V2. A value 'T4' in the map of FIG. 14 represents a time required for the rating process of increasing stepwise the minimum slip rate Vsmin from the value V2 and is longer than the time T3 to ensure a gentler stepwise change of the minimum slip rate Vsmin. The times 'T1' and 'T3' are set in a specific range of ensuring no interference with slip detection based on the slip rate Vs in the case of the driver's relatively heavy depression of the accelerator pedal 63. The times 'T2' and 'T4' are set in a specific range of ensuring slip control in the case of the driver's release of the accelerator pedal 63 in response to the occurrence of a slip. The maximum and the minimum slip rates Vsmax and Vsmin are set equal to or close to 0, except the maximum slip rate Vsmax at the gear change from or to the D position and the minimum slip rate Vsmin at the gear change from or to the R position. The slip rate Vs is set by restricting the tentative slip rate Vstmp with the maximum and the minimum slip rates Vsmax and Vsmin. This arrangement effectively prevents the slip rate Vs from being set to a generally unexpected value with regard to the setting of the gearshift position SP.

Figure 15:
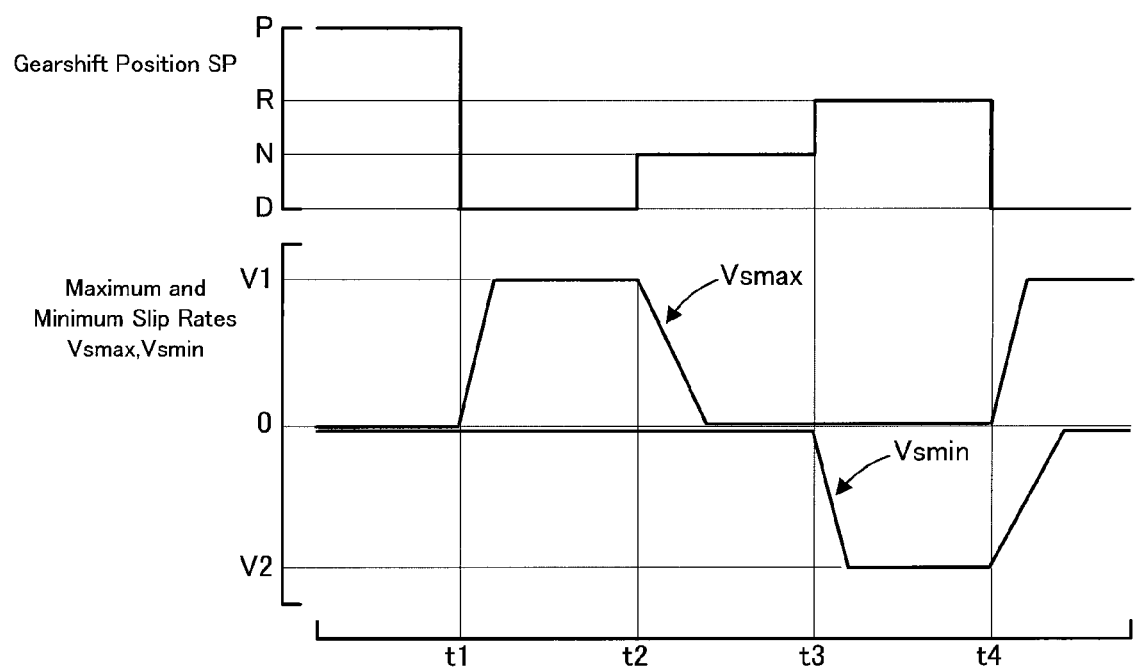
FIG. 15 shows time changes of the gearshift position SP and the maximum and minimum slip rates Vsmax and Vsmin.

FIG. 15 shows time changes of the gearshift position SP and the maximum and minimum slip rates Vsmax and Vsmin. As illustrated, at the gearshift position SP set to the P position, the maximum slip rate Vsmax and the minimum slip rate Vsmin are both set equal to 0. In response to a change of the gearshift position SP from the P position to the D position (time point t1), the minimum slip rate Vsmin is set to a negative value close to 0, whereas the maximum slip rate Vsmax increases stepwise at a relatively high rate with time to the value V1. In response to a subsequent change of the gearshift position SP from the D position to the N position (time point t2), the minimum slip rate Vsmin is set equal to 0, whereas the maximum slip rate Vsmax decreases stepwise at a relatively low rate with time from the value V1 to 0. In response to a change of the gearshift position SP from the N position to the R position (time point t3), the maximum slip rate Vsmax is set to a positive value close to 0, whereas the minimum slip rate Vsmin decreases stepwise at a relatively high rate with time to the value V2. In response to a subsequent change of the gearshift position SP from the R position to the D position (time point t4), the maximum slip rate Vsmax increases stepwise at a relatively high rate with time to the value V1, whereas the minimum slip rate Vsmin increases stepwise at a relatively low rate with time to a positive value close to 0.

After setting the slip rate Vs, the CPU 52 compares the set slip rate Vs with the preset threshold value Vs2 (step S440). The slip rate Vs of not less than the threshold value Vs2 suggests the occurrence of a slip of the drive wheels 34a and 34b. The CPU 52 then sets the slip detection flag Fs to 1 (step S450) and sets the maximum drive rate β of the motor 22 according to the estimated vehicle body speed Ve and the slip rate Vs in order to restrict the torque output from the motor 22 (step S460), before exiting from this modified flow of the maximum drive rate setting routine. The slip rate Vs of less than the threshold value Vs2, on the other hand, suggests no occurrence of a slip or the convergence of a slip. The CPU 52 then resets the slip detection flag Fs to 0 (step S470) and sets the maximum drive rate β of the motor 22 to 100% (step S480), before exiting from this modified flow of the maximum drive rate setting routine.

The modified flow of the maximum drive rate setting routine shown in FIG. 7 is executed to eliminate various errors. These errors to be eliminated are, for example, the error caused by the non-zero setting of the brake torque Tbf even in the vehicle stop condition and included in the estimated vehicle body speed Ve computed according to Equation (1), and the error caused by non-inclusion of the term of the road surface slope θ in Equation (1) and included in the estimated vehicle body speed Ve computed according to Equation (1). Such elimination of the errors desirably enhances the reliabilities of the estimated vehicle body speed Ve and the slip rate Vs and ensures adequate slip detection based on the slip rate Vs. In response to detection of a slip, the traction control (TRC) of the brake system 40 and the drive restriction of the motor 22 are enabled for slip control.

The primary differences of the modified flow of the maximum drive rate setting routine of FIG. 7 from the maximum drive rate setting routine of FIG. 4 include the processing of steps S340 and S350 to adjust the brake torque Tbf with the brake torque reflection factor K corresponding to the computed drive wheel speed Vw, the processing of steps S370 to S390 to adjust the estimated vehicle body speed Ve with the offset value ΔVe corresponding to the road surface slope θ, and the processing of steps S410 to S430 to set the slip rate Vs by restricting the tentative slip rate Vstmp with the maximum and the minimum slip rates Vsmax and Vsmin with regard to the setting of the gearshift position SP. Any one or two of these three primary differences may be omitted according to the requirements.

The modified flow of the maximum drive rate setting routine of FIG. 7 sets the negative value Vref slightly smaller than 0 to the offset value Δve at the road surface slope θ suggesting the flat road. The offset value Δve may, however, be set to 0 at the road surface slope θ suggesting the flat road.

In the modified example, the modified flow of the maximum drive rate setting routine of FIG. 7 sets the offset value Δve corresponding to the road surface slope θ, adds the offset value ΔVe to the estimated vehicle body speed Ve computed according to Equation (1) to offset and adjust the estimated vehicle body speed Ve, and sets the slip rate Vs based on the result of subtraction of the estimated vehicle body speed Ve after adjustment from the computed drive wheel speed Vw at steps S370 to S430. One modified procedure may set the offset value ΔVe corresponding to the road surface slope θ and directly adjust the slip rate Vs based on the computed drive wheel speed Vw, the estimated vehicle body speed Ve computed according to Equation (1), and the offset value Δve. This latter procedure sets the slip rate Vs based on the result of subtraction of the sum of the estimated vehicle body speed Ve computed according to Equation (1) and the offset value ΔVe from the computed drive wheel speed Vw and is thus equivalent to the former procedure of the modified example.

In the modified example, as shown in FIGS. 11 to 14, the rate of the stepwise increase of the maximum slip rate Vsmax to the value V1 is different from the rate of the stepwise decrease of the maximum slip rate Vsmax toward 0. These rates may alternatively be equal to each other. Similarly the rate of the stepwise decrease of the minimum slip rate Vsmin to the value V2 is different from the rate of the stepwise increase of the minimum slip rate Vsmin toward 0. These rates may also alternatively be equal to each other. The maximum slip rate Vsmax and the minimum slip rate Vsmin may be changed abruptly, instead of the stepwise changes by the rating process.

Figure 16:
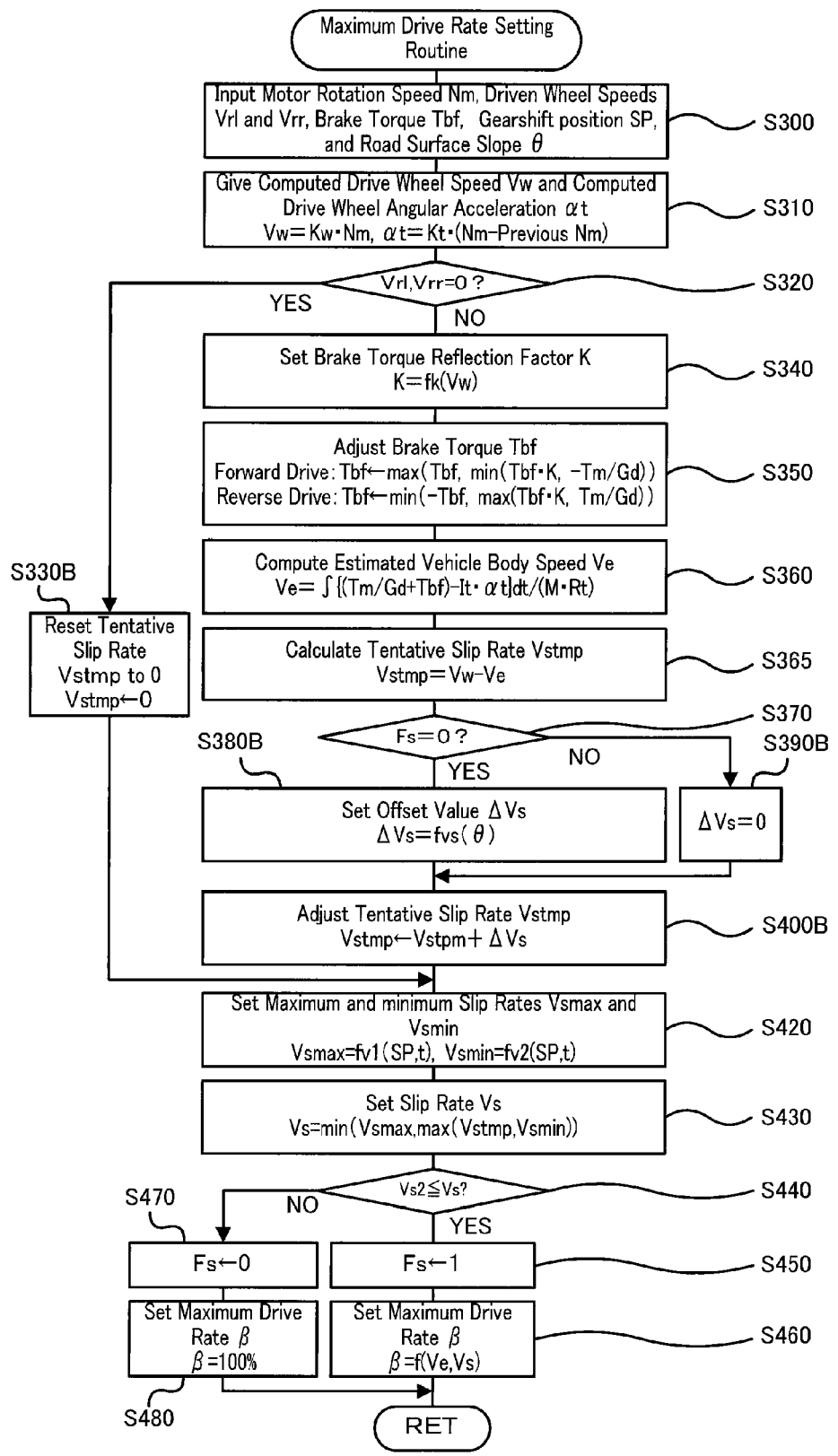
FIG. 16 is a flowchart showing a modification of the modified flow of the maximum drive rate setting routine of FIG. 7.

The modified flow of the maximum drive rate setting routine of FIG. 7 adjusts the estimated vehicle body speed Ve computed at step S360 with the offset value ΔVe corresponding to the road surface slope θ at steps S370 to S400. The modified flow then calculates the tentative slip rate Vstmp by subtracting the estimated vehicle body speed Ve from the computed drive wheel speed Vw at step S410. One modification of this flow may calculate a tentative slip rate Vstmp in advance as a difference between the estimated vehicle body speed Ve computed at step S360 and the computed drive wheel speed Vw and adjust the tentative slip rate Vstmp with an offset value set corresponding to the road surface slope θ. Such modification of the maximum drive rate setting routine of FIG. 7 is shown in the flowchart of FIG. 16. In the maximum drive rate setting routine of FIG. 16, identical steps with those of the maximum drive rate setting routine of FIG. 7 are represented by the like step numbers, while different but corresponding steps are represented by the like step numbers with a suffix 'B'. When at least one of the driven wheel speeds Vrl and Vrr is not equal to 0 at step S320, the maximum drive rate setting routine of FIG. 16 computes the estimated vehicle body speed Ve at step S360 and calculates a tentative slip rate Vstmp by subtracting the estimated vehicle body speed Ve from the computed drive wheel speed Vw (step S365) and identifies the value of the slip detection flag Fs (step S370). When the slip detection flag Fs is equal to 1, an offset value ΔVs is set according to the input road surface slope θ (step S380B). When the slip detection flag Fs is equal to 0, on the other hand, the offset value ΔVs is set to 0 (step S390B). The set offset value ΔVs is added to the calculated tentative slip rate Vstmp to offset and adjust the tentative slip rate Vstmp (step S400B). The offset value ΔVs represents an adjustment value of the tentative slip rate Vstmp. A concrete procedure of setting the offset value ΔVs may experimentally or otherwise specify and store a variation in offset value ΔVs against the road surface slope θ as an offset value setting map in the ROM 54 and read the offset value ΔVs corresponding to the given road surface slope θ from this offset value setting map. This offset value setting map has the similar tendency to that of the offset value setting map of FIG. 9 with inversion of the sign, since the tentative slip rate Vstmp is calculated by subtraction of the estimated vehicle body speed Ve from the computed drive wheel speed Vw. When the driven wheel speeds Vrl and Vrr are both equal to 0 at step S320, the tentative slip rate Vstmp is reset to 0 (step S330B). After adjustment of the tentative slip rate Vstmp, the processing of and after step S420 is executed in the same manner as described above with reference to the maximum drive rate setting routine of FIG. 7. The maximum drive rate setting routine of FIG. 16 accordingly has the similar effects and advantages to those of the maximum drive rate setting routine of FIG. 7.

The electric vehicle 20 of the embodiment sets the maximum drive rate β to be decreased with an increase in slip rate Vs in the range of the slip rate Vs of not less than the preset threshold value Vs2. One modified procedure may set the maximum drive rate β to a fixed value of less than 100% in the range of the slip rate Vs of not less than the preset threshold value Vs2.

The electric vehicle 20 of the embodiment resets the integrated value of the estimated vehicle body speed Ve to 0 at the driven wheel speeds Vrl and Vrr both equal to 0. One modified procedure may not reset the integrated value of the estimated vehicle body speed Ve to 0, irrespective of the values of the driven wheel speeds Vrl and Vrr.

The electric vehicle 20 of the embodiment is equipped with the TRC off switch 68. The TRC off switch 68 is, however, not essential but may be omitted from the electric vehicle 20 when not required.

The electric vehicle 20 of the embodiment has the brake system 40 and enables the drive restriction of the motor 22 to control a slip having the slip rate Vs of not less than the preset threshold value Vs2, which is sufficiently greater than the relatively small threshold value Vs1 suggesting the occurrence of a slip by the brake system 40. One modified procedure may enable the drive restriction of the motor 22 to control a slip having the slip rate Vs of not less than a preset threshold value Vs2, which is slightly greater than the threshold value Vs1. One modified structure of the electric vehicle 20 may not have the brake system 40 but may enable the drive restriction of the motor 22 to control a slip having the slip rate Vs of not less than a preset threshold value Vs2, which is set irrespective of the threshold value Vs1.

Figure 17:
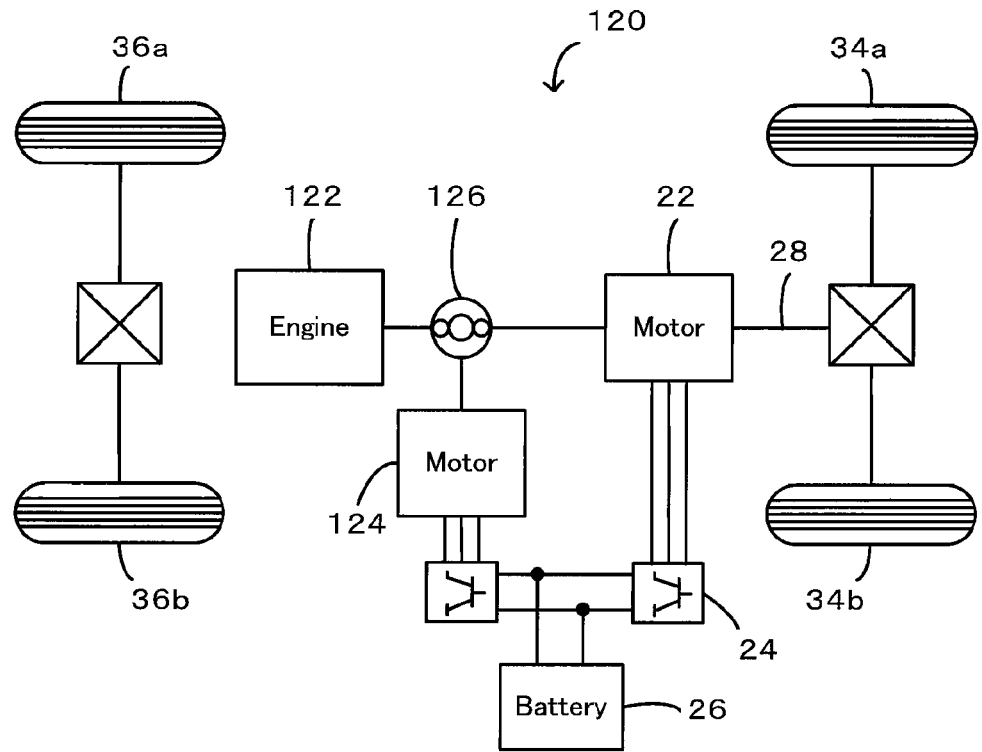
FIG. 17 schematically shows the configuration of a hybrid vehicle 120 in one modified example.
Figure 18:
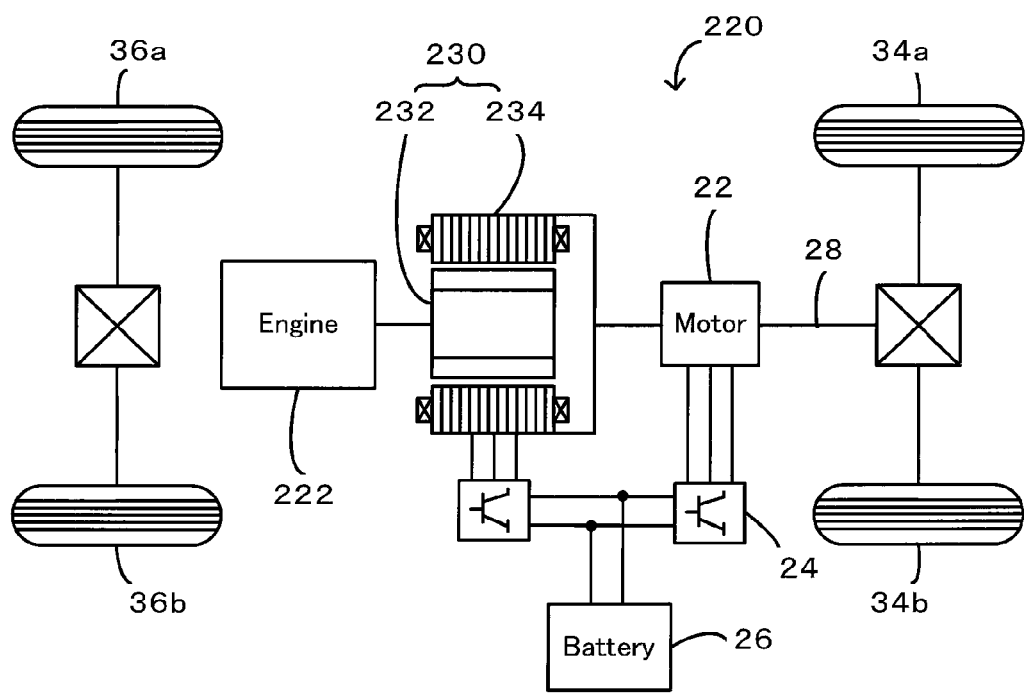
FIG. 18 schematically shows the configuration of another hybrid vehicle 220 in another modified example.

The embodiment regards application of the invention to the electric vehicle 20 equipped with the motor 22 configured to input and output power from and to the driveshaft 28. The principle of the invention is also applicable to a hybrid vehicle 120 in one modified example shown in FIG. 17. The hybrid vehicle 120 of FIG. 17 is equipped with an engine 122 and a motor 124 configured to output power to a driveshaft 28 via a planetary gear mechanism 126, in addition to the motor 22 configured to input and output power from and to the driveshaft 28. The principle of the invention is further applicable to another hybrid vehicle 220 in another modified example shown in FIG. 18. The hybrid vehicle 220 of FIG. 18 is equipped with an engine 222 and a pair-rotor motor 230, in addition to the motor 22 configured to input and output power from and to the driveshaft 28. The pair-rotor motor 230 includes an inner rotor 232 connected to a crankshaft of the engine 222 and an outer rotor 234 connected to a driveshaft 28. The pair-rotor motor 230 transmits part of the output power of the engine 222 to the driveshaft 28, while converting the residual engine output power into electric power.

The primary elements in the embodiment are mapped to the primary constituents in the claims of the invention as described below. The motor 22 linked with the drive wheels 34a and 34b via the differential gear 32 and configured to input and output power from and to the driveshaft 28 in the embodiment is equivalent to the "power source" of the invention. The main electronic control unit 50 configured to calculate the rotation speed Nm of the motor 22 from the rotational position θm of the rotor in the motor 22 detected by the rotational position detection sensor 23 is equivalent to the 'rotation speed detector' of the invention. The main electronic control unit 50 configured to execute the processing of step S210 of subtracting the previous rotation speed Nm from the current rotation speed of the motor 22 and multiplying the result of the subtraction by the conversion factor Kt for conversion into the angular acceleration of the drive wheels 34a and 34b to determine the computed drive wheel angular acceleration αt is equivalent to the 'angular acceleration computation module' of the invention. The main electronic control unit 50 configured to execute the processing of step S210 of multiplying the rotation speed Nm of the motor 22 by the conversion factor Kw for conversion into the rotation speed of the drive wheels 34a and 34b to determine the computed drive wheel speed Vw is equivalent to the 'drive wheel rotation speed computation module' of the invention. The main electronic control unit 50 configured to execute the processing of step S230 of computing the estimated vehicle body speed Ve by integration over a time period from a start of the vehicle to the current moment based on the motor torque Tm, the brake torque Tbf, the gear ratio Gd, the moment of inertia It, the computed drive wheel angular acceleration αt, the mass M of the vehicle, and the radius Rt of the drive wheels 34a and 34b is equivalent to the 'estimated vehicle body speed computation module' of the invention. The main electronic control unit 50 configured to execute the processing of steps S240 and S250 of calculating the slip rate Vs of the drive wheels 34a and 34b by subtraction of the estimated vehicle body speed Ve from the computed drive wheel speed Vw and of detecting the occurrence or non-occurrence of a significantly large slip based on the result of comparison between the calculated slip rate Vs and the preset threshold value Vs2 is equivalent to the 'slip detection module' of the invention. The main electronic control unit 50 configured to execute the processing of steps S250 to S270 of setting the maximum drive rate b to 100% at the slip rate Vs of less than the preset threshold value Vs2 while setting the maximum drive rate β according to the estimated vehicle body speed Ve and the calculated slip rate Vs at the slip rate Vs of not less than the threshold value Vs2 and to execute the drive control of steps S100 to S170 based on the set maximum drive rate b is equivalent to the 'control module' of the invention. The brake system 40 configured to control a slip by means of a supply of hydraulic pressure from the brake actuator 44 is equivalent to the 'slip controller' of the invention. The TRC off switch 68 provided in front of the driver's seat is equivalent to the 'slip controller off switch' of the invention. The motor 22 connected with the driveshaft 28 is equivalent to the 'motor' of the invention. The above mapping of the primary elements in the embodiment to the primary constituents in the claims of the invention is not restrictive in any sense but is only illustrative for concretely describing the mode of carrying out the invention. Namely the embodiment discussed above is to be considered in all aspects as illustrative and not restrictive.

The embodiment regards application of the invention to the electric vehicle 20. The principle of the invention is also applicable to various vehicles including automobiles and trains, as well as to control methods of various vehicles including automobiles and trains.

The embodiment discussed above is to be considered in all aspects as illustrative and not restrictive. There may be many modifications, changes, and alterations without departing from the scope or spirit of the main characteristics of the present invention.

The present application claims the benefit of priority from Japanese Patent Application No. 2006-273168 filed on Oct. 4, 2006, and Japanese Patent Application No. 2007-169200 filed on Jun. 27, 2007, the entire contents of both of which are incorporated herein by reference.

INDUSTRIAL APPLICABILITY

The technique of the present invention is preferably applied to the manufacturing industries of vehicles.

The invention claimed is:

1. A vehicle, comprising:
a power source arranged to output driving power to a driveshaft linked with a drive wheel;
a rotation speed detector structured to obtain a rotation speed of the driveshaft as a driveshaft rotation speed;
an angular acceleration computation module configured to compute an angular acceleration of the drive wheel as a computed drive wheel angular acceleration from the obtained driveshaft rotation speed;
a drive wheel rotation speed computation module configured to compute a rotation speed of the drive wheel as a computed drive wheel rotation speed from the obtained driveshaft rotation speed;
an estimated vehicle body speed computation module configured to compute an estimated speed of a vehicle body as an estimated vehicle body speed by integration of an actual driving force actually used for driving the vehicle and the computed drive wheel angular acceleration;
a slip detection module configured to detect occurrence or non-occurrence of a certain slip of the drive wheel, based on a rotation speed of the drive wheel expected from the estimated vehicle body speed and the computed drive wheel rotation speed; and
a control module configured, in response to detection of non-occurrence of the certain slip by the slip detection module, to control the power source to output a driving force corresponding to a driving force demand required for driving and drive the vehicle with the output driving force, and in response to detection of the occurrence of the certain slip by the slip detection module, to control the power source to output a driving force corresponding to the driving force demand with drive restriction of the power source and drive the vehicle with the restricted output driving force.

2. The vehicle in accordance with claim 1, the vehicle further having a slip controller configured to detect a slip or no slip of the drive wheel based on a rotation speed of the drive wheel as a drive wheel rotation speed and to apply a braking force to the drive wheel, in response to detection of the slip, in order to control the slip of the drive wheel,
wherein the certain slip represents a slip having a slip rate of not less than a preset threshold value that is greater than a minimum slip rate suggesting detection of a slip by the slip controller, where the slip rate is obtained by subtracting a calculated wheel speed of the drive wheel corresponding to a vehicle body speed from an actual wheel speed of the drive wheel with detection of the slip.

3. The vehicle in accordance with claim 2, the vehicle further having a slip controller off switch provided in a neighborhood of a driver's seat of the vehicle and configured to deactivate the slip controller.

4. The vehicle in accordance with claim 1, wherein the estimated vehicle body speed computation module computes the estimated vehicle body speed by time integration of a difference between the actual driving force actually used for driving the vehicle and a product of the computed drive wheel angular acceleration and a moment of inertia of the drive wheel.

5. The vehicle in accordance with claim 4, wherein the estimated vehicle body speed computation module resets an integrated value of the time integration to 0, when a calculated wheel speed of the drive wheel corresponding to a vehicle body speed is equal to 0.

6. The vehicle in accordance with claim 1, the vehicle further having a braking force application structure configured to apply a braking force to the drive wheel,
wherein the estimated vehicle body speed computation module computes the estimated vehicle body speed based on the actual driving force actually used for driving the vehicle, which is equal to a sum of a driving force output from the power source and a braking force output from the braking force application structure.

7. The vehicle in accordance with claim 6, wherein the estimated vehicle body speed computation module corrects the braking force output from the braking force application structure according to the computed drive wheel rotation speed to set a braking force for computation of the estimated vehicle body speed and computes the estimated vehicle body speed based on a sum of the driving force output from the power source and the set braking force for computation of the estimated vehicle body speed.

8. The vehicle in accordance with claim 7, wherein the estimated vehicle body speed computation module sets the braking force for computation of the estimated vehicle body speed with a change of a plus-minus sign relative to a change of a plus-minus sign of the computed drive wheel rotation speed.

9. The vehicle in accordance with claim 7, wherein the estimated vehicle body speed computation module sets 0 to the braking force for computation of the estimated vehicle body speed when the computed drive wheel rotation speed is in a predetermined first range including a value of 0.

10. The vehicle in accordance with claim 9, wherein the estimated vehicle body speed computation module sets the braking force for computation of the estimated vehicle body speed to have a stepwise change relative to a variation in computed drive wheel rotation speed, when the computed drive wheel rotation speed is in a predetermined second range including the predetermined first range.

11. The vehicle in accordance with claim 1, wherein the slip detection module detects the occurrence or non-occurrence of the certain slip, based on the estimated vehicle body speed, a road surface slope, and the computed drive wheel rotation speed.

12. The vehicle in accordance with claim 11, wherein the slip detection module corrects the estimated vehicle body speed according to the road surface slope and detects the occurrence or non-occurrence of the certain slip based on the corrected estimated vehicle body speed and the computed drive wheel rotation speed.

13. The vehicle in accordance with claim 12, wherein the slip detection module corrects the estimated vehicle body speed to eliminate an error induced by the road surface slope and included in the estimated vehicle body speed.

14. The vehicle in accordance with claim 12, wherein upon detection of the occurrence of the certain slip of the drive wheel, the slip detection module does not perform the correction of the estimated vehicle body speed according to the road surface slope.

15. The vehicle in accordance with claim 1, wherein the slip detection module restricts a slip rate as a difference between the estimated vehicle body speed and the computed drive wheel rotation speed with an upper limit value and a lower limit value, which are set corresponding to a driver's selected gearshift position among multiple gearshift positions including a forward drivable gearshift position and a reverse drivable gearshift position, and detects the occurrence or non-occurrence of the certain slip of the drive wheel based on the restricted slip rate.

16. The vehicle in accordance with claim 15, wherein the slip detection module restricts the slip rate with the upper limit value and the lower limit value set equal to 0 at any gearshift position other than the forward drivable gearshift position and the reverse drivable gearshift position, restricts the slip rate with the upper limit value set equal to a preset first value and the lower limit value set equal to 0 or a negative value close to 0 at the forward drivable gearshift position, and restricts the slip rate with the upper limit value set equal to 0 or a positive value close to 0 and the lower limit value set equal to a preset second value at the reverse drivable gearshift position.

17. The vehicle in accordance with claim 16, wherein the slip detection module performs a rating process to change the upper limit value and the lower limit value in a stepwise manner in response to a change of the gearshift position.

18. The vehicle in accordance with claim 17, wherein the slip detection module sets the upper limit value by increasing stepwise at a first rate to the preset first value in response to a change of the gearshift position to the forward drivable gearshift position, and sets the upper limit value by decreasing stepwise at a second rate, which is smaller than the first rate, from the preset first value in response to a change of the gearshift position from the forward drivable gearshift position to another gearshift position.

19. The vehicle in accordance with claim 17, wherein the slip detection module sets the lower limit value by decreasing stepwise at a third rate to the preset second value in response to a change of the gearshift position to the reverse drivable gearshift position, and sets the lower limit value by increasing stepwise at a fourth rate, which is smaller than the third rate, from the preset second value in response to a change of the gearshift position from the reverse drivable gearshift position to another gearshift position.

20. The vehicle in accordance with claim 1, wherein the control module controls the power source with a greater drive restriction in response to a greater degree of a slip.

21. The vehicle in accordance with claim 1, wherein the power source includes a motor connected to the driveshaft, and
the rotation speed detector detects a rotational position of a rotor in the motor and computes the driveshaft rotation speed from the detected rotational position.

22. A control method of a vehicle equipped with a power source configured to output driving power to a driveshaft linked with a drive wheel,
the control method comprising:
computing an estimated speed of a vehicle body as an estimated vehicle body speed by integration of an actual driving force actually used for driving the vehicle and a computed drive wheel angular acceleration computed from a driveshaft rotation speed as a rotation speed of the driveshaft;
detecting occurrence or non-occurrence of a certain slip of the drive wheel, based on a rotation speed of the drive wheel expected from the estimated vehicle body speed and a computed drive wheel rotation speed computed from the driveshaft rotation speed; and
in response to detection of non-occurrence of the certain slip, controlling the power source to output a driving force corresponding to a driving force demand required for driving and drive the vehicle with the output driving force, and in response to detection of the occurrence of the certain slip, controlling the power source to output a driving force corresponding to the driving force demand with drive restriction of the power source and drive the vehicle with the restricted output driving force.

* * * * *

UNITED STATES PATENT AND TRADEMARK OFFICE
CERTIFICATE OF CORRECTION

PATENT NO. : 7,957,881 B2
APPLICATION NO. : 12/279438
DATED : June 7, 2011
INVENTOR(S) : Takao Itoh It is certified that error appears in the above-identified patent and that said Letters Patent is hereby corrected as shown below:

On the Title Page: Replace "(22) PCT Filed: Oct. 4, 2006" with
--(22) PCT Filed: Sept. 28, 2007--.

Title Page, Item (57) Abstract:
Replace the Abstract to read as follows:

--The occurrence or non-occurrence of a certain slip of a drive wheel is detected based on only a motor torque used for driving a vehicle, a brake torque, and a rotation speed of a motor computed from an output of a rotational position detection sensor. In response to detection of the occurrence of the certain slip, drive restriction of the motor is activated for slip control. The slip control is attainable by a brake system and the drive restriction of the motor. Even in the event of any failure or abnormality arising in the brake system or in the event of prohibiting traction control of the brake system in response to the driver's operation of a TRC off switch, the drive restriction of the motor accomplishes the slip control. This arrangement desirably prevents slip-induced unstable driving of the vehicle and damages of devices involved in slip control for the vehicle.--

| Column | Line | |
|---|---|---|
| 13 | 57 | Change "value Δve" to --value ΔVe--. |
| 13 | 61 | Change "value Δve" to --value ΔVe--. |
| 13 | 62 | Change "value Δve" to --value ΔVe--. |
| 13 | 64 | Change "value Δve" to --value ΔVe--. |
| 14 | 1 | Change "value Δve" to --value ΔVe--. |
| 14 | 4 | Change "value Δve" to --value ΔVe--. |
| 14 | 7 | Change "value Δve" to --value ΔVe--. |
| 14 | 12 | Change "value Δve" to --value ΔVe--. |
| 14 | 14 | Change "value Δve" to --value ΔVe--. |

Signed and Sealed this
Tenth Day of January, 2012

David J. Kappos
*Director of the United States Patent and Trademark Office*

CERTIFICATE OF CORRECTION (continued)
U.S. Pat. No. 7,957,881 B2

| Column | Line | |
|---|---|---|
| 16 | 57 | Change "value Δve" to --value ΔVe--. |
| 16 | 58 | Change "value Δve" to --value ΔVe--. |
| 16 | 62 | Change "value Δve" to --value ΔVe--. |
| 17 | 5 | Change "value Δve" to --value ΔVe--. |